(12) United States Patent
Thomsen

(10) Patent No.: US 6,862,596 B2
(45) Date of Patent: Mar. 1, 2005

(54) SYSTEM AND METHOD FOR RETRIEVING AND DISPLAYING DATA, SUCH AS ECONOMIC DATA RELATING TO SALARIES, COST OF LIVING AND EMPLOYEE BENEFITS

(75) Inventor: David J. Thomsen, Newport Beach, CA (US)

(73) Assignee: ERI Economic Research Institute, Inc., Redmond, WA (US)

(*) Notice: Subject to any disclaimer, the term of this patent is extended or adjusted under 35 U.S.C. 154(b) by 310 days.

(21) Appl. No.: 09/849,455

(22) Filed: May 4, 2001

(65) Prior Publication Data

US 2002/0046210 A1 Apr. 18, 2002

Related U.S. Application Data

(60) Provisional application No. 60/203,086, filed on May 9, 2000.

(51) Int. Cl.[7] .............................................. G06F 17/30
(52) U.S. Cl. ............................. 707/10; 707/3; 707/102; 705/10; 705/11; 709/203; 709/219
(58) Field of Search ................................ 707/3–5, 6, 7, 707/10, 102, 104.1; 705/10, 11; 709/203, 219

(56) References Cited

U.S. PATENT DOCUMENTS

| | | | | |
|---|---|---|---|---|
| 5,960,407 A | * | 9/1999 | Vivona | ........................ 705/10 |
| 2001/0032097 A1 | * | 10/2001 | Levey | ............................ 705/1 |
| 2001/0047347 A1 | * | 11/2001 | Perell et al. | .................... 707/1 |
| 2002/0002479 A1 | * | 1/2002 | Almog et al. | ................... 705/8 |
| 2002/0002482 A1 | * | 1/2002 | Thomas | ........................ 705/10 |
| 2002/0026452 A1 | * | 2/2002 | Baumgarten et al. | .... 707/104.1 |
| 2002/0046074 A1 | * | 4/2002 | Barton | ........................... 705/8 |
| 2002/0143752 A1 | * | 10/2002 | Plunkett et al. | ................ 707/3 |
| 2002/0188542 A1 | * | 12/2002 | Zhang et al. | ................. 705/36 |
| 2003/0145015 A1 | * | 7/2003 | Turnasella | ............... 707/104.1 |
| 2003/0208388 A1 | * | 11/2003 | Farkas et al. | ................... 705/7 |

* cited by examiner

*Primary Examiner*—Alford W. Kindred
*Assistant Examiner*—Leslie Wong
(74) *Attorney, Agent, or Firm*—Perkins Coie LLP

(57) ABSTRACT

A system and method for retrieving and displaying data, such as economic data. The method can include receiving over a computer network a user request for a first item of economic data, retrieving the first item of economic data from a database, and providing a display description for view by the user over the computer network with the display description including the first item of economic data. The method can further include receiving a second item of economic data from the user over the computer network and at least reducing a fee from the user for receiving the first item of economic data. In another embodiment, the method can include displaying a plurality of discrete data items to the user and receiving a selection of one of the discrete data items from the user resulting from the user at least aligning a cursor on the graphical display with the selected discrete data item. The method can further include retrieving additional data corresponding to the selected discrete data item and providing instructions for displaying the additional data to the user.

22 Claims, 51 Drawing Sheets

Fig. 4C

Please print this document now. Attempting to return to this page may require you to provide another payment.

SA1-193-48-00016-000007510 (1)

U.S./Canada Wage & Salary Survey Report

Search Results: ← 812

| | |
|---|---|
| Position Title: | Lan Administrator |
| Requested City: | Austin, Texas United States |
| | Austin-San Marcos, TX MSA |
| Salary Survey Median: | 62,645 UNITED STATES DOLLARS |
| Survey/Source Name: | SalariesReview U.S./Canada Internet Based Salary Survey |
| Survey Publisher: | SalariesReview.com |
| Survey Publication Date: | 12-Aug-2001 |
| Latest Data Collection Date: | 01-Jul-2001 |
| Population: | 40 ← 813 |
| Number of Organizations: | 28 |
| Salary Survey Area: | Location: Austin, TEXAS, UNITED STATES |
| | Area: Austin-San Marcos, TX MSA |
| | Counties: BASTROP; CALDWELL; HAYS; TRAVIS; WILLIAMSON |

Alternate Titles
Lan Administrator; Network (lan) Administrator; Local Area Network Administrator; Computer (lan) Administrator

Survey Position Description
Responsible for evaluating, developing, maintaining, along with usage of telecommunication systems. Acquires, installs, and maintains company's local area network. Reads technical manuals and brochures to determine equipment which meets establishment requirements. Assist in presenting to management recommendations related to purchasing and installing hardware, software and telecommunication equipment. Manages LAN security and network performance. Establishes and implements LAN policies, procedures, and standards and ensures their conformance with information systems and company's objectives. Develops and writes procedures for installation, use, and solving problems of communications hardware and software. Instructs users in use of equipment. May oversee or assist in installation of communications hardware. May perform minor equipment repairs.

*Fig. 8B*

| Currency: *UNITED STATES DOLLARS* | | | | | | |
|---|---|---|---|---|---|---|
| Position | Incumbents | Firms | Low | Median | High | Bonus |
| • Lan Administrator | 40 | 28 | 42,174 | 62,645 | 75,152 | 5,010 |

N/R = Not Reported;   N/A = Not Applicable
Exchange Rate = 1.0 UNITED STATES DOLLAR per 1 U.S. Dollar (04 Jan 2000)

814

Methodology/Disclaimer

Complete methodology for this report can be found at "www.salariesreview.com/surveys/methodology1.cfm" or by clicking the Methodology link above.

Complete Reports and In-Depth Analyses

- For a full report on cost-of-living data in 298 U.S./Canada cities (incorporating data for 88 positions surveyed by SalariesReview.com), along with demographic, cost of living, and other data affecting employment, see the:

Geographic Reference Report or

- For an interactive software program & database that calculate unlimited #'s of competitive compensation analyses for 5,000 job titles as compiled from all publicly available (over 2,000) salary surveys, including SalariesReview.com, see the:

Salary Assessor

Report Date: 12-Aug-2001
Country-of-origin values based on exchange rates effective 04-Jan-2000

End of Report

SalariesReview.com — The Business of Pay Information

OurStory | Surveys | Decision Map | Shopping Cart | Feedback

Available Surveys

U.S./Canada Wage & Salary
U.S./Canada Cost-of-Living ◁
U.S./Canada Employee Benefit
International Remuneration
International Cost-of-Living CPAs click here!
AICPA
Affinity Program Provider

ECONOMIC RESEARCH

U.S./Canada Cost of Living Survey Report

Search Results:

| | |
|---|---|
| Search Request: | NANAIMO, BRITISH COLUMBIA  CANADA |
| Survey/Source Name: | SalariesReview International Cost-of-Living Internet Based Survey |
| Survey Publisher: | SalariesReview.com |
| Survey Publication Date: | 22-Feb-2000 |
| Latest Data Collection Date: | 01-Jan-2000 |
| Cost-of-Living Survey Area: | NANAIMO, CANADA ERI OES AREA |

⟵ 902

Table 1

Observations of costs found within walking distance (2 kilometers or 1.25 miles of a city's central area). Assume a married professional or mid-management consumer with an equivalent of $ 48,000 in U.S. earnings and American buying habits.

| Category Employee Type Cost Item | Reported Average U.S. DOLLARS | Reported Average CANADIAN DOLLARS | # of Observations |
|---|---|---|---|
| For the Traveler - Temporarily Stationed Employee | | | |
| 1. DAILY amount for meals and incidental expenses for the traveling businessperson. | 79 | 114 | 1 |
| 2. Hotel room - DAILY rate for average room - twin bed. | 61 | 89 | 1 |
| Taxes - | | | |
| 3. Sales or Value-Added tax rate on Consumables. | 5 | 7 | 1 |
| 4. Residence (owned) property tax/mill rates (/1000). | 1 | 1 | 1 |

*Fig. 9B*

| | | | | | |
|---|---|---|---|---|---|
| Consumables - Temporarily Stationed Employee | | | | | |
| 5. Price of ONE loaf of bread. | | 2 | | 3 | 1 |
| 6. Price of ONE adult sized white T-shirt. | | 4 | | 6 | 1 |
| 7. Price of ONE 'Big Mac' or equivalent .7 gram or 1/4 lb hamburger sandwich (with toppings). | | 3 | | 4 | 1 |
| 8. ONE container, .8 liter or 12 oz Coca Cola/equivalent. | | 1 | | 1 | 1 |
| Housing - Long Term Stationed Employee | | | | | |
| 9. Monthly rent for 2,200 sq. ft. (~190 sq. meters) home. | | 1,194 | | 1,731 | 1 |
| 10. MONTHLY rent for 2 bedroom (~85 sq. meters or 900 sq. ft.). | | 467 | | 677 | 1 |
| 11. MONTHLY utilities' cost, (~147 sq. meters or 1,560 sq. ft. residence - if available - including base telephone fee). | | 242 | | 351 | 1 |
| 12. MONTHLY electrical rate per kilowatt hour. | | 6 | | 8 | 1 |
| Services - Long Term Stationed Employee | | | | | |
| 13. ONE Office visit with general practitioner for periodic medical exam (physician's fee, before insurance). | | 70 | | 101 | 1 |
| 14. Total MONTHLY premium for median cost family HMO (or equivalent coverage ie., any National Plan). | | N/R | | N/R | N/A |
| 15. AVERAGE daily cost for a semi-private hospital room for a non-national. | | 573 | | 831 | 1 |
| Transportation - Long Term Stationed Employee | | | | | |
| 16. 2.5 Liters or 1 gallon of regular mid-level gasoline. | | 1 | | 2 | 1 |
| 17. ANNUAL auto insurance as a % of auto value. | | 4 | | 5 | 1 |
| 18. ANNUAL auto registration plus fees as a % of auto value. | | 0 | | 0 | 1 |
| Cost-of-Living Comparison - Long Term Stationed Employee | | | | | |
| 19. COL compared to U.S.: $ 48,000 in earnings. | | 62,343 | | 90,397 | N/A |
| 20. COL % compared to U.S. and Country National. | | 129.88 | | 111.12 | N/A |

N/R = Not Reported;  N/A = Not Applicable
Exchange Rate = 1.45 CANADIAN DOLLAR per 1 U.S. Dollar (04 Jan 2000)

904

<u>Methodology/Description</u>

*Fig. 9C*

Complete methodology for this report can be found at "www.salariesreview.com/surveys/methodology2.cfm" or by clicking the Methodology link above.

Complete Reports and In-Depth Analyses

- Line 19 results are from ERI's Relocation Assessor's Two-City Comparison Analysis. Enter any earnings level, base and destination cities, and review the related costs, including personal income taxes.

For this interactive software program & database that calculates unlimited #'s of cost-of-living analyses between any of over 5,800 U.S./Canada and 1,400 international city/areas, see: *906

Relocation Assessor

Report Date: 22-Feb-2000
End of Report

An Economic Research Institute E-Commerce Site
Copyright 1999 - 2000, Economic Research Institute. All Rights Reserved.
This site requires the use of Microsoft Internet Explorer 4.x or above.

*Fig. 9D*

| 12 | AVERAGE daily cost for a semi-private hospital room for a non-national. | |
| 13 | Total MONTHLY premium for median cost family HMO (or equivalent coverage ie., any National Plan). | |
| 14 | Sales or Value-Added tax rate on Consumables | |
| 15 | Residence (owned) property tax/mill rates (/1000) | |
| 16 | 1 Liter of regular mid-level gasoline (if U.S., then 1 Gallon) | |
| 17 | ANNUAL auto insurance as a % of auto value. | |
| 18 | ANNUAL auto registration plus fees as a % of auto value. | |

910

Submit Data

An ERI Economic Research Institute E-Commerce Site
Copyright 1999 - 2000, Economic Research Institute. All Rights Reserved.
Patent Pending.
This site requires the use of Microsoft Internet Explorer 4.x or above.

ERI Employee Benefits Survey Report

| | |
|---|---|
| Search Request: | Atlanta, Georgia  United States Atlanta, GA MSA |
| Survey/Source Name: | SalariesReview U.S./Canada Internet Based Employee Benefits Survey |
| Survey Publisher: | SalariesReview.com |
| Survey Publication Date: | 15-Mar-2000 |
| Latest Data Collection Date: | 01-Jan-2000 |
| Number of Employees: | 11397 |
| Number of Organizations: | 29 |
| Employee Benefits Survey Area: | ATLANTA, GEORGIA, UNITED STATES ATLANTA, GA MSA |
| Major Industry Represented: | All Industry |

Category                                     Reported Averages

Employee's Monthly Contribution

| Type of Plan | Single | Family |
|---|---|---|
| Managed Care | 38.68 | 146.63 |
| Traditional | 41.63 | 147.7 |
| Dental | 9.81 | 27.33 |
| Not Known | 3.45 % (Medical) | 3.45 % (Dental) |

1002 →

Employer Monthly Medical and Dental Benefit Cost

| Type of Plan | Single | Family |
|---|---|---|
| Managed Care | 165.05 | 455.35 |
| Traditional | 180.05 | 489.12 |

*Fig. 10B*

Dental 21.65 57.32
No Coverage 20.69 % 20.69 %

Payments for Time Not Worked

| Years of Service | 1 | Number of Days | | 20 | Carried Over |
| --- | --- | --- | --- | --- | --- |
| | | 5 | 10 | | |
| Vacation | 9.97 | 14.36 | 17.47 | 20.15 | 27.59 % |
| Sick Leave | 10.18 | 13.08 | 15.43 | 16.61 | 37.93 % |
| Holidays | 9.86 | | | | 3.45 % |
| Personal Leave | 3.43 | | | | 3.45 % |

Other Benefits Offered to Employees — Organizations Offering Benefits

| | |
| --- | --- |
| Basic Group Life Insurance | 96.55 % |
| Supplemental Life Insurance | 72.41 % |
| Vision | 44.83 % |
| Long Term Disability | 89.66 % |
| Short Term Disability | 89.66 % |
| Flexible (125) Plan - Payroll Option | 44.83 % |
| Flexible (125) Plan - Dependent Care FSA | 62.07 % |
| Flexible (125) Plan - Healthcare FSA | 62.07 % |
| Employee Assistance Plan | 65.52 % |
| Retirement - Pension Plan (Defined Benefit) | 3.45 % |
| Retirement - Profit Sharing - 401(k) | 68.97 % |
| Retirement - ESOP | 3.45 % |
| Long Term Care | 13.79 % |

Professional Service Costs

| | |
| --- | --- |
| Local area costs are not known | 17.24 % |
| Semi-private room in hospital before insurance | 229.93 |
| Doctor's office visit before insurance (patient examination) | 46.14 |
| Dentist's office visit before insurance (patient examination) | 35.98 |

1004

Report Date: 15-Mar-2000
Country-of-origin values based on exchange rates effective 28-Jan-2000

End of Report

 20% Complete

IV. Check the industry for which you are providing data (more than one may be checked)

All Industry
- ☐ 9999  ALL INDUSTRY

Agriculture, Forestry, Fishing & Mining
- ☐ 100   AGRICULTURE, FORESTRY, AND FISHING
- ☐ 1000  MINING  ← 1008
- ☐ 1200  COAL MINING
- ☐ 1300  OIL AND GAS EXTRACTION
- ☐ 1400  NONMETALLIC MINERALS, EXCEPT FUELS

Construction
- ☐ 1599  CONSTRUCTION
- ☐ 1600  HEAVY CONSTRUCTION, EX. BUILDING

Manufacturing
- ☐ 2000  MANUFACTURING
- ☐ 2100  TOBACCO PRODUCTS & LIQUOR PRODUCTS
- ☐ 2200  TEXTILE MILL PRODUCTS
- ☐ 2300  APPAREL AND OTHER TEXTILE PRODUCTS
- ☐ 2500  FURNITURE AND FIXTURES
- ☐ 2600  PAPER AND ALLIED PRODUCTS
- ☐ 2700  PRINTING AND PUBLISHING
- ☐ 2815  CHEMICALS AND ALLIED PRODUCTS
- ☐ 2830  DRUGS, MEDICINALS AND BOTANICALS
- ☐ 2900  PETROLEUM AND COAL PRODUCTS
- ☐ 3000  RUBBER AND MISC. PLASTICS PRODUCTS
- ☐ 3100  LEATHER AND LEATHER PRODUCTS
- ☐ 3200  STONE, CLAY, AND GLASS PRODUCTS
- ☐ 3300  PRIMARY METAL INDUSTRIES
- ☐ 3400  FABRICATED METAL PRODUCTS
- ☐ 3620  INDUSTRIAL MACHINERY AND EQUIPMENT

*Fig. 10E*

☐ 3900 MISCELLANEOUS MANUFACTURING INDUSTRIES

Transportation & Public Utilities

☐ 4010 TRANSPORTATION AND PUBLIC UTILITIES
☐ 4100 LOCAL AND INTERURBAN PASSENGER TRANSPORT
☐ 4200 TRUCKING AND WAREHOUSING
☐ 4400 WATER TRANSPORTATION
☐ 4500 TRANSPORTATION BY AIR
☐ 4825 COMMUNICATION
☐ 4830 RADIO AND TELEVISION BROADCASTING
☐ 4910 ELECTRIC, GAS, AND SANITARY SERVICE
☐ 4920 PIPELINES, EXCEPT NATURAL GAS
☐ 4930 COMBINATION UTILITY SERVICES

1010 → Wholesale Trade

☐ 5000 WHOLESALE TRADE-DURABLE GOODS
☐ 5040 PROFESSIONAL & COMMERCIAL EQUIPMENT
☐ 5100 WHOLESALE TRADE-NONDURABLE GOODS

Retail Trade

☐ 5200 FURNITURE AND HOMEFURNISHINGS STORE
☐ 5300 APPAREL AND ACCESSORY STORES
☐ 5400 FOOD STORES
☐ 5500 AUTOMOTIVE DEALERS, REPAIR & STATIONS

Finance

☐ 6020 DEPOSITORY INSTITUTIONS
☐ 6060 CREDIT UNIONS
☐ 6100 NONDEPOSITORY INSTITUTIONS
☐ 6210 HOLDING AND OTHER INVESTMENT OFFICE
☐ 6355 INSURANCE CARRIERS
☐ 6411 INSURANCE AGENTS, BROKERS, & SERVIC
☐ 6511 REAL ESTATE
☐ 6790 MISCELLANEOUS INVESTING, TRUSTS

Services

☐ 7000 SERVICES
☐ 7371 COMPUTER SOFTWARE PREPACKAGED
☐ 7379 COMPUTER AND DATA PROCESSING SERVICES
☐ 7389 BUSINESS SERVICES

*Fig. 10F*

☐ 7800 MOTION PICTURES
☐ 7900 AMUSEMENT & RECREATION SERVICES
☐ 8015 HEALTH SERVICES
☐ 8050 HOSPITALS
☐ 8200 MUSEUMS, BOTANICAL, ZOOLOGICAL GARDENS
☐ 8200 EDUCATIONAL SERVICES
☐ 8600 NONPROFIT ORGANIZATIONS
☐ 8710 ENGINEERING & MANAGEMENT SERVICES
☐ 8980 LEGAL SERVICES

Government
☐ 9000 PUBLIC ADMINISTRATION

V. Employee's Monthly Contribution

| | Single | Family | Not Known |
|---|---|---|---|
| Managed Care (HMO/ National or State Plan) | 6 | 9 | ☐ 12 |
| PPO, Indemnity | 7 | 10 | |
| Dental | 8 | 11 | ☐ 13 |

1014

VI. Employer's Monthly Medical and Dental Benefit Cost (if known)

| | Single | Family | No Coverage |
|---|---|---|---|
| Managed Care (HMO) | 45 | 48 | ☐ 51 |
| Traditional (PPO, Indemnity) | 46 | 49 | |
| Dental | 47 | 50 | ☐ 52 |

1015

VII. Payments For Time Not Worked?

| Benefit | Number of days (Round down to whole number) | | | | Length of service (Round down to whole number years) | Can carry over to next year if not used? (Check box if "Yes") |
|---|---|---|---|---|---|---|
| Years of Service | 1 | 5 | 10 | 20 | | |
| Vacation | 29 | 30 | 31 | 32 | 27 | ☐ 33 |
| Sick Leave | 34 | 35 | 36 | 37 | 28 | ☐ 38 |
| Holidays | 39 | | | | | ☐ 40 |
| Personal Leave | 41 | | | | | ☐ 42 |

1016

VIII. Any other benefits offered by your organization?

PLAN (Check all that applies)

- ☐ Basic Group Life Insurance 14
- ☐ Supplemental Life Insurance 15
- ☐ Vision 16
- ☐ Long Term Disability 17
- ☐ Short Term Disability 18
- ☐ U.S. (125) Plan - Pretax Payroll Deductions 19
- ☐ U.S. (125) Plan - Dependent Care FSA 20
- ☐ U.S. (125) Plan - Healthcare FSA 21
- ☐ Employee Assistance Plan 22
- ☐ Retirement - Pension Plan (Defined Benefit) 23
- ☐ Retirement Profit Sharing 401(k) 24
- ☐ Retirement-ESOP 25
- ☐ Long Term Care 26

1018

IX. Professional Service Costs

| | | Not Known |
|---|---|---|
| Cost of hospital semi-private room before insurance | 54 | ☐ 53 |
| Cost of visit to doctor's office (Patient examination) before insurance | 55 | |
| Cost of visit to dentist's office (Routine examination) before insurance | 56 | |

Table 1

Currency: U.S. DOLLARS

| Position | Incumbents | Firms | Low | Median | High | Bonus |
|---|---|---|---|---|---|---|
| • General Clerk | 10 | 5 | 12,270 | 16,808 | 20,674 | 0 |

**Country of Origin Currency: *MARKKAA (FINNMARK)***

| Position | Incumbents | Firms | Low | Median | High | Bonus |
|---|---|---|---|---|---|---|
| • General Clerk | 10 | 5 | 73,986 | 101,351 | 124,662 | 0 |

N/R = Not Reported;   N/A = Not Applicable
Exchange Rate = 6.03 MARKKAA (FINNMARK) per 1 U.S. Dollar (04 Jan 2000)

Methodology/Description

Complete methodology for this report can be found at
"www.salariesreview.com/surveys/methodology1.cfm" or by clicking the Methodology link above.

Complete Reports and In-Depth Analyses

- For a full report on cost-of-living data in 210 countries (incorporating all data for the 18 cost items surveyed by SalariesReveiw.com), along with demographic, salary, and other data affecting employment see:

International Reference Report or

- For an interactive software program & database that calculates unlimited #'s of cost-of-living analyses between any of over 5,800 U.S./Canada and 1,400 international city/areas, see:

Relocation Assessor

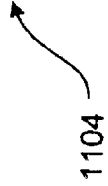
1104

Report Date: 22-Feb-2000
Country-of-origin values based on exchange rates effective 04-Jan-2000

End of Report

An Economic Research Institute E-Commerce Site
Copyright 1999 - 2000, Economic Research Institute. All Rights Reserved.
This site requires the use of Microsoft Internet Explorer 4.x or above.

| | | | |
|---|---|---|---|
| Taxes - | | | |
| 3. Sales or Value-Added tax rate on Consumables. | N/R | N/R | N/A |
| 4. Residence (owned) property tax/mill rates (/1000). | N/R | N/R | N/A |
| Consumables - Temporarily Stationed Employee | | | |
| 5. Price of ONE loaf of bread. | 3 | 20 | 1 |
| 6. Price of ONE adult sized white T-shirt. | 6 | 45 | 1 |
| 7. Price of ONE 'Big Mac' or equivalent .7 gram or 1/4 lb hamburger sandwich (with toppings) | 4 | 27 | 1 |
| 8. ONE container, .8 liter or 12 oz Coca Cola/equivalent. | 1 | 7 | 1 |
| Housing - Long Term Stationed Employee | | | |
| 9. Monthly rent for 2,200 sq. ft. (~190 sq. meters) home. | 13,594 | 105,761 | 1 |
| 10. MONTHLY rent for 2 bedroom (~85 sq. meters or 900 sq. ft.). | 6,676 | 51,939 | 1 |
| 11. MONTHLY utilities' cost, (~147 sq. meters or 1,560 sq. ft. residence - if available - including base telephone fee). | 329 | 2,556 | 1 |
| 12. MONTHLY electrical rate per kilowatt hour. | 11 | 87 | 1 |
| Services - Long Term Stationed Employee | | | |
| 13. ONE Office visit with general practitioner for periodic medical exam (physician's fee, before insurance). | 90 | 699 | 1 |
| 14. Total MONTHLY premium for median cost family HMO (or equivalent coverage ie., any National Plan). | 761 | 5,920 | 1 |
| 15. AVERAGE daily cost for a semi-private hospital room for a non-national. | 316 | 2,462 | 1 |
| Transportation - Long Term Stationed Employee | | | |

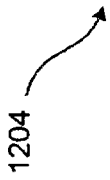

| 16. 2.5 Liters or 1 gallon of regular mid-level gasoline. | 2 | 19 | 1 |
| --- | --- | --- | --- |
| 17. ANNUAL auto insurance as a % of auto value. | 1 | 6 | 1 |
| 18. ANNUAL auto registration plus fees as a % of auto value. | 0 | 1 | 1 |

Cost-of-Living Comparison - Long Term Stationed Employee

| 19. COL compared to U.S. $ 48,000 in earnings. | 181,722 | 1,413,797 | N/A |
| --- | --- | --- | --- |
| 20. COL % compared to U.S. and Country National. | 378.59 | 101.17 | N/A |

N/R = Not Reported;  N/A = Not Applicable
Exchange Rate = 7.78 HONG KONG DOLLAR per 1 U.S. Dollar  (04 Jan 2000)

Methodology/Description

Complete methodology for this report can be found at
"www.salariesreview.com/surveys/methodology4.cfm" or by clicking the Methodology link above.

Complete Reports and In-Depth Analyses

- For a full report on cost-of-living data in 210 countries (incorporating all data for the 18 cost items surveyed by SalariesReview.com), along with demographic, salary, and other data affecting employment see:  <u>International Reference Report</u> or

- Line 19 results are from ERI's Relocation Assessor's Two-City Comparison Analysis. Enter any earnings level, base and destination cities, and review the related costs, assuming tax equalization by the employer.

For this interactive software program & database that calculates unlimited #'s of cost-of-living analyses between any of over 5,800 U.S./Canada and 1,400 international city/areas, see:

<u>Relocation Assessor</u>

Report Date: 22-Feb-2000
Country-of-origin values based on exchange rates effective 04-Jan-2000
End of Report

*Fig. 12E* objectives. Develops and writes procedures for installation, use, and solving problems of communications hardware and software. Instructs users in use of equipment. May oversee or assist in installation of communications hardware. May perform minor equipment repairs.

Table 1

Currency: *U.S. DOLLARS*

| Position | Incumbents | Firms | Low | Median | High | Bonus |
|---|---|---|---|---|---|---|
| • Lan Administrator | 49 | 34 | 43,255 | 63,303 | 77,079 | 5,138 |

N/R = Not Reported;    N/A = Not Applicable
Exchange Rate = 1.0 UNITED STATES DOLLAR per 1 U.S. Dollar (28 Jan 2000)

Methodology/Disclaimer

Complete methodology for this report can be found at "www.salariesreview.com/surveys/methodology1.cfm" or by clicking the Methodology link above.

Complete Reports and In-Depth Analyses

- For a full report on cost-of-living data in 298 U.S./Canada cities (incorporating data for 88 positions surveyed by SalariesReview.com), along with demographic, cost of living, and other data affecting employment, see the:    Geographic Reference Report or

- For an interactive software program & database that calculate unlimited #'s of competitive compensation analyses for 5,000 job titles as compiled from all publicly available (over 2,000) salary surveys, including SalariesReview.com, see the:
Salary Assessor Report Date: 30-Mar-2000
Country-of-origin values based on exchange rates effective 28-Jan-2000

End of Report

U.S./Canada Wage & Salary Survey Report

Search Request:

Dental Hygienist
Seattle, Washington United States
Seattle-Bellevue-Everett, WA PMSA Date Effective: 01-Jul-2001

Search Results:

| | |
|---|---|
| Survey Position Title | Dental Hygienist |
| Salary Survey Median: | US$ 52,340 |
| Survey/Source Name: | ERI U.S./Canada Internet Based Salary Survey |
| Survey Publisher: | ERI Economic Research Institute |
| Survey Publication Date: | 12-Aug-2001 |
| Latest Data Collection Date: | 01-Jul-2001 |
| Number of Employees: | 1,249 |
| Number of Organizations: | 490 |
| Salary Survey Area: | Seattle |
| | Seattle-Bellevue-Everett, WA PMSA |

Alternate Titles
Medical Dental Hygienist

Survey Position Description
Performs dental prophylaxis: Cleans calcareous deposits, accretions, and stains from teeth and beneath margins of gums, using dental instruments. Feels lymph nodes under patient's chin to detect swelling or tenderness that could indicate presence of oral cancer. Feels and visually examines gums for sores and signs of disease. Examines gums, using probes, to locate periodontal recessed gums

SYSTEM AND METHOD FOR RETRIEVING AND DISPLAYING DATA, SUCH AS ECONOMIC DATA RELATING TO SALARIES, COST OF LIVING AND EMPLOYEE BENEFITS

CROSS-REFERENCE TO RELATED APPLICATIONS

The present application claims priority to U.S. Provisional Application No. 60/203,086, filed May 9, 2000 and incorporated herein by reference.

TECHNICAL FIELD

The following relates generally to retrieving and displaying data, such as economic data related to salaries, cost of living, and employee benefits.

BACKGROUND

Databases and search engines for obtaining information related to salaries, cost of living, and employee benefits for a variety of geographical locations are known. Users can access such databases by submitting an inquiry that includes, for example, a selected industry, a selected job or position within the industry, and a geographical location. The search engine returns a range of salaries corresponding to the user's inquiry. In one conventional arrangement, the database and search engine are stored on a computer-readable medium, such as a CD, which is directly accessible to the user by loading the CD into the user's computer.

One problem with some existing databases and search engines is that the information returned by the search engine may be generic. Accordingly, it may be difficult for users to obtain specific information about the company and the job or position corresponding to the information stored in the database. Another problem is that it can be expensive to assemble the data and provide the search engine. When this expense is passed on to the user, the number of users willing to pay for the search may be limited. Still another problem is that it may be difficult and/or expensive to update the database frequently enough to keep up with rapidly changing information.

The Internet is increasingly being used to conduct searches and "electronic commerce," in part, because it facilitates electronic communications between vendors and purchasers. The Internet comprises a vast number of computers and computer networks interconnected through communication channels. Electronic commerce refers generally to commercial transactions at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce and upon creating new opportunities previously unavailable. For example, if electronic commerce can be easily conducted, then even the novice computer user will choose to engage in electronic commerce. Therefore, it is important that techniques be developed to facilitate conducting electronic commerce.

The Internet facilitates conducting electronic commerce, in part, because it uses standardized techniques for exchanging information. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special-purpose application program for requesting and displaying web pages.

Currently, web pages are often defined using HyperText Markup Language ("HTML"). HTML provides a standard set of tags that defines how a web page is to be displayed. When a user makes a request to the browser to display a web page, the browser sends the request to the server computer system to transfer to the client computer system an HTML document that defines the web page. When the requested HTML document is received by the client computer system, the browser displays the web page as defined by the HTML document. The HTML document contains various tags that control the display of text, graphics, controls, and other features. The HTML document may contain URLs of other web pages available on that server computer system or on other server computer systems.

The World Wide Web portion of the Internet is especially conducive to conducting electronic commerce. Many web servers have been developed through which vendors can advertise and sell products. The products can include items (e.g., music) that are delivered electronically to the purchaser over the Internet and items (e.g., books) that are delivered through conventional distribution channels (e.g, a common carrier). A server computer system may provide an electronic version of a catalog that lists the items available. A user, who is a potential purchaser, may browse through the catalog using a browser and select various items to be purchased. When the user has finished selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming web page to the client computer system, and schedules shipment of the items.

Although the Internet provides the features described above, these features have not addressed the foregoing problems associated with searching and accessing economic databases. Accordingly, there exists a need for a system that addresses those problems.

BRIEF DESCRIPTION OF THE DRAWINGS

FIGS. 4A–D illustrate display descriptions for displaying economic data in accordance with an embodiment of the invention.

FIGS. 8A–D illustrate display descriptions for presenting and receiving wage and salary data in accordance with an embodiment of the invention.

FIGS. 9A–F illustrate display descriptions for presenting and receiving cost of living data in accordance with an embodiment of the invention.

FIGS. 10A–H illustrate display descriptions for presenting and receiving employee benefit data in accordance with an embodiment of the invention.

FIGS. 11A–D illustrate display descriptions for presenting and receiving international remuneration data in accordance with an embodiment of the invention.

FIGS. 12A–F illustrate display descriptions for presenting and receiving international cost of living data in accordance with an embodiment of the invention.

FIGS. 13A–C illustrate display descriptions for presenting and receiving college graduate data in accordance with an embodiment of the invention.

FIGS. 14A–D illustrate display descriptions for accessing data derived from a plurality of populations in accordance with an embodiment of the invention.

DETAILED DESCRIPTION

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention. In general, alternatives and alternate embodiments described in this application are substantially similar to previously described embodiments, and common elements and acts or steps are identified by the same reference numbers. Only significant differences in construction or operation are described in detail.

Certain aspects of the invention are directed to systems and methods for reducing or eliminating fees incurred by users accessing economic data over a computer network. For example, one method includes allowing the users to contribute economic data in lieu of fees. The contributed economic data can be added to a database and used to fill subsequent requests for data by the same or a different user. Another aspect of the invention is directed to providing additional information pertaining to a particular data item, such as a data point on a graphical display. For example, one method includes displaying additional information when the user aligns a cursor with a particular data point and/or clicks on the data point. Still another aspect of the invention is directed to allowing users to select from a variety of economic databases over a computer network when fulfilling a request for economic data.

Figure 1:
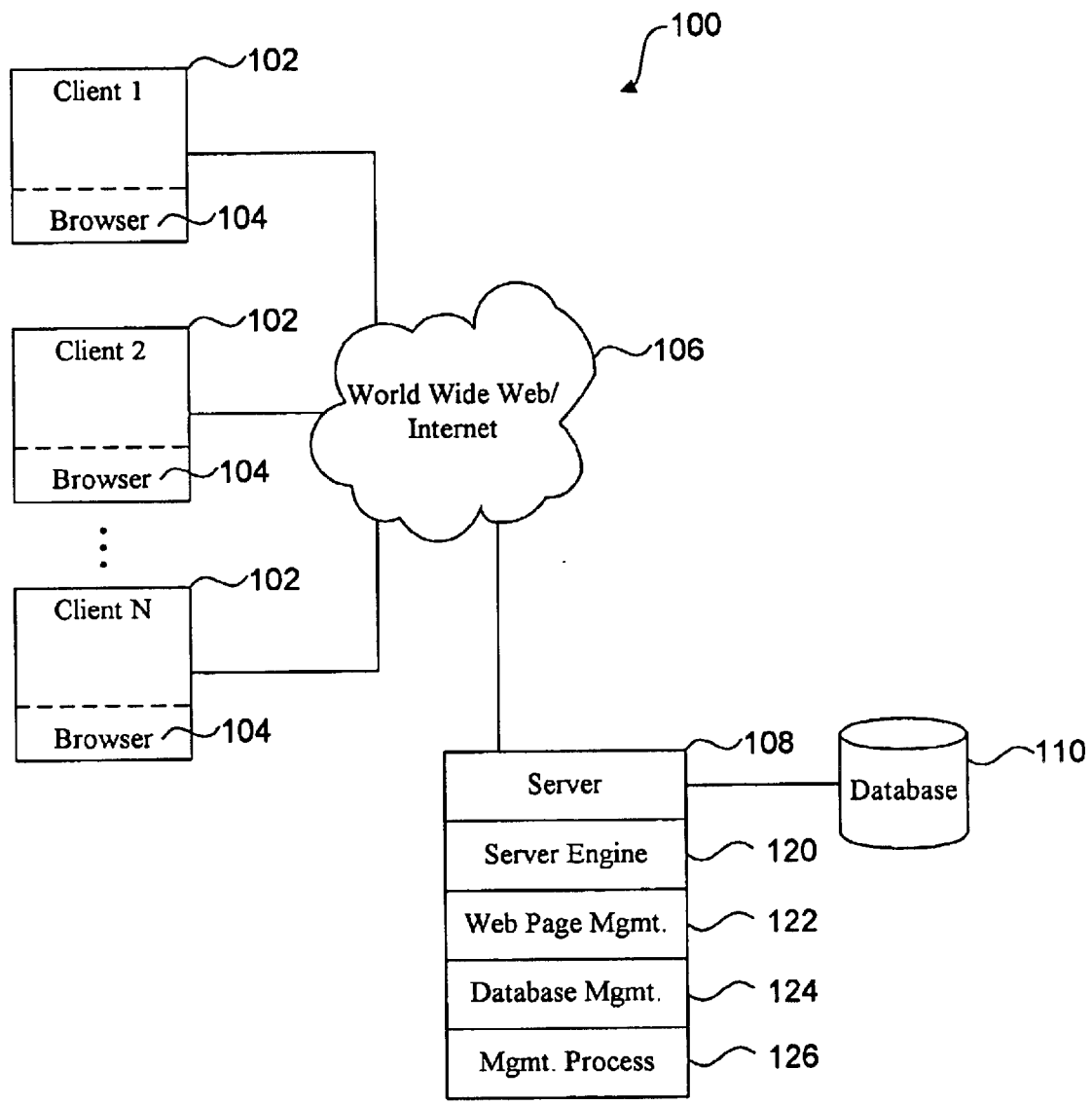
FIG. 1 is a schematic block diagram illustrating components of a computer system having a client computer and a server computer for retrieving and displaying data in accordance with an embodiment of the invention.

FIG. 1 and the following discussion provide a brief, general description of a suitable computing environment in which embodiments of the invention can be implemented. Although not required, the embodiments of the invention will be described in the general context of computer-executable instructions, for example, routines executed by a general-purpose computer, such as a personal computer. Those skilled in the relevant art will appreciate that the invention can be practiced with other computer system configurations, including Internet appliances, hand-held devices, wearable computers, set-top boxes, mobile phones, multiprocessor systems, multiprocessor-based or programmable consumer electronics, network PCs, minicomputers, mainframe computers, and the like. The invention can be embodied in a specific-purpose computer or data processor that is specifically programmed, configured or constructed to perform one or more of the computer-executable instructions explained in detail below. The invention can also be practiced in distributed computing environments where tasks or modules are performed by remote processing devices, which are linked through a communications network. In a distributed computing environment, program modules or sub-routines may be located in both local and remote memory storage devices. In general, while hardware platforms, such as terminals and controllers are described herein, aspects of the invention are equally applicable to nodes on the network having corresponding resource locators to identify such nodes.

Unless described otherwise, the construction and operation of the various blocks shown in FIG. 1 are of conventional design. As a result, such blocks need not be described in further detail herein, as they will be readily understood by those skilled in the relevant art.

Referring to FIG. 1, a data retrieval and display system 100 includes one or more client computers 102, each of which includes a browser program module 104 that permits the computer to access and exchange data with the Internet, including web sites within a World Wide Web ("Web") portion 106 of the Internet. The client computers 102 may include one or more central processing units or other logic processing circuitry, memory, input devices (e.g., keyboards and pointing devices), output devices (e.g, display devices and printers), and storage devices (e.g., fixed, floppy and optical disk drives, magnetic cassettes, flash memory cards, digital video disks (DVDs), Bernoulli cartridges, RAMs, ROMs, smart cards, etc.), all well known but not shown in FIG. 1. The client computers 102 may also include other program modules, such as an operating system, one or more application programs (e.g., word processing or spread sheet applications), and the like. The client computers 102 can be operated by a user such as a customer or potential customer of goods, for example, economic data related to salaries, compensation, cost of living, and/or employee benefits.

A server computer 108, coupled to the Web 106, performs some or all of the data retrieval and display processes. A database 110, coupled to the server computer 108, stores much of the data exchanged between the client computers 102 and the server computer 108 as described below. The server computer 108 includes a server engine 120, a web page management component 122, a database management component 124, a management process component 126, as well as other components not shown in FIG. 1. The server engine 120, the web page management component 122, the database management component 124, and the management process component 126 operate together to retrieve information from the database 110 and provide the information to the client computers 102. In one embodiment, the server computer 108 and the database 110 can form a single computing platform. Alternatively, the functions performed by the server computer 108 and/or the database 110 can be distributed over a plurality of platforms. The foregoing components can also operate together to receive information from the client computers and update the database 110 with the information, as described in greater detail below with reference to FIGS. 6–13C.

In one embodiment, the system 100 can include a first component (e.g., a first software component) installed on the client computer 102 and/or a second component (e.g., a second software component) that operates on the client computer 102, the Web 106, and the server computer 108. In other embodiments, the system 100 can have other arrangements; for example, the two components of the system 100 can be coupled.

Figure 2:
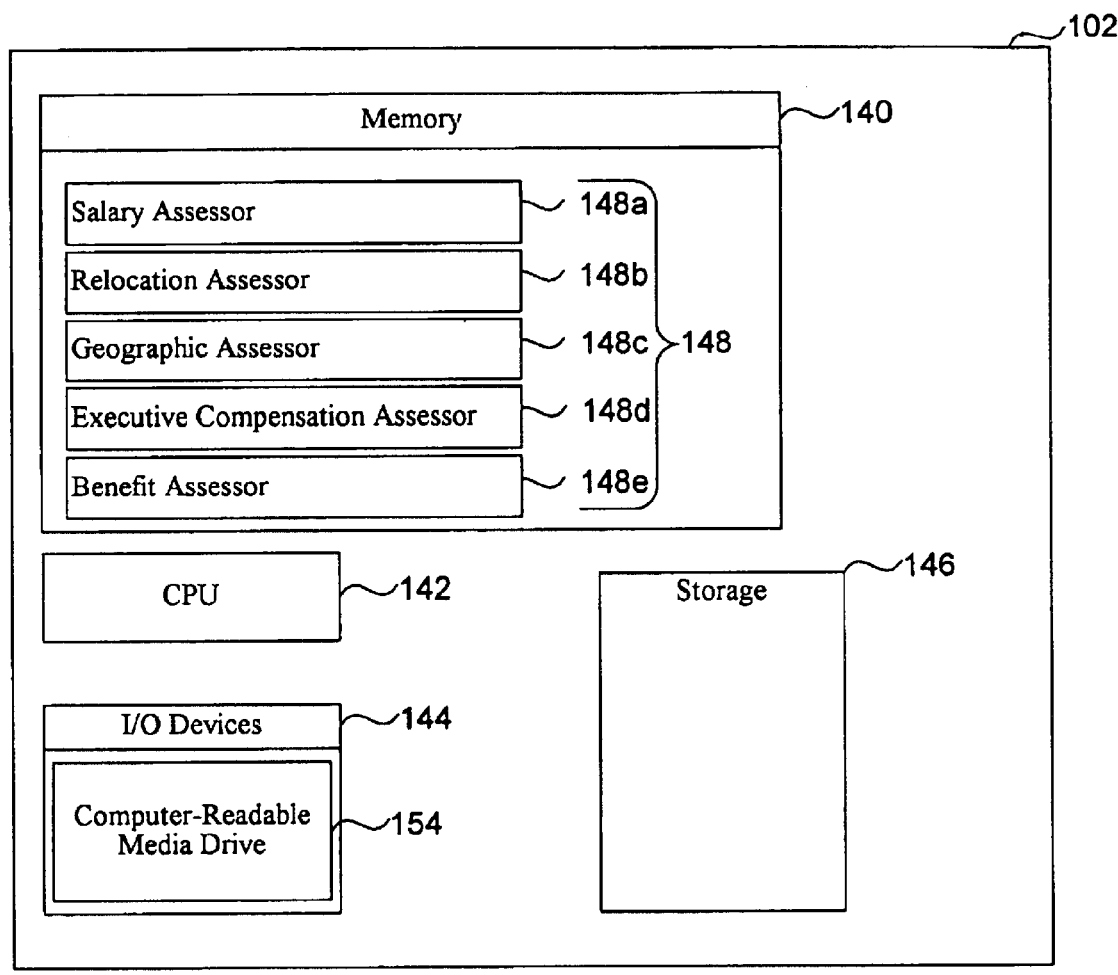
FIG. 2 is a schematic block diagram illustrating in further detail components of the client computer shown in FIG. 1.

FIG. 2 is a schematic block diagram illustrating in further detail components of the computer 102 shown in FIG. 1. In one embodiment, the computer 102 can include a memory 140, a CPU 142, input/output devices 144 and a storage device 146. The memory 140 can include software or other computer instructions for implementing a method in accordance with an embodiment of the invention. For example, the software can include five modules, such as a Salary Assessor 148a for providing salary data, a Relocation Assessor 148b for providing cost of living data, a Geographic Assessor 148c for providing salary data in one geographic location based on a salary in another geographic location, an Executive Compensation Assessor 148d for providing executive compensation data, and a Benefit Assessor 148e for providing employee benefit data. The Assessors 148a–148e are referred to collectively herein as "Assessors 148."

The input/output devices 144 can include devices such as a computer-readable media drive 154. Accordingly, the input/output devices 144 can read computer-readable media having the software for the Assessors 148. For example, the Assessors 148 can be contained on a CD and read by a CD drive. The software can also be accessible from the memory 140, as described above. Alternatively, the Assessors 148 can be accessed over the Web 106, and can be installed on the server computer 108 (FIG. 1). The storage device 146 can include file storage for data generated and/or accessed by the Assessors 148.

In one embodiment, the Salary Assessor 148a can receive input data or criteria, such as a selected industry, a selected geographical location and a selected job or position, and can output a range of salaries corresponding to the input criteria. The Relocation Assessor 148b can receive input data such as an income level at a first geographical location, and a living standard (e.g., size of home, number of cars) and can output data reflecting the corresponding salary and living standard in a second geographical location, based on the difference in cost of labor between the two locations. The Geographic Assessor 148c can receive input data, such as a salary and a first Geographical location, and can output the corresponding salary in a second geographical location, based on the difference in the cost of labor between the two locations. The Executive Compensation Assessor 148d can receive input data, such as a geographical location, an industry type and company size (based on annual revenue), and can output a range of compensation levels for executives of companies corresponding to the input data. The Benefit Assessor 148e can similarly provide benefit data and analyses. The statistical engines and processes used to extract the output data based on an input request are conventional and available from Economic Research Institute of Redmond, Washington (www.erieri.com).

Figure 3:
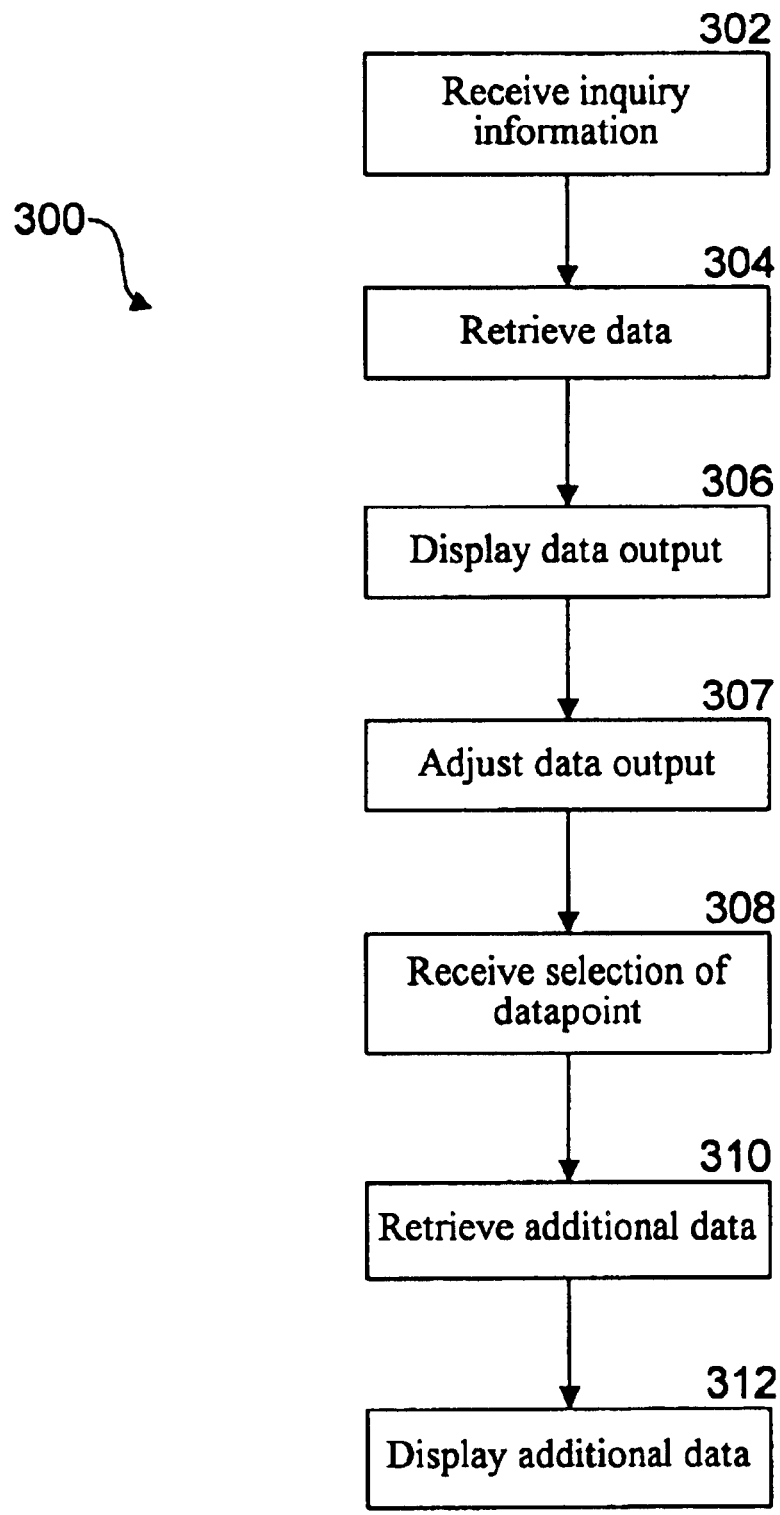
FIG. 3 is a flow diagram of a representative implementation of an information retrieval and display process performed by the system of FIG. 1 in accordance with an embodiment of the invention.

FIG. 3 is a flow diagram of a representative retrieval and display process 300 performed generally by the system 100 (FIG. 1) and more particularly by one or more of the Assessors 148 described above with reference to FIG. 2. Display pages corresponding to a specific embodiment of the process 300 as performed by an embodiment of the Executive Compensation Assessor 148d are provided in FIGS. 4A–5G. Accordingly, the following discussion refers both to the process steps shown in FIG. 3 and the display pages shown in FIGS. 4A–5G.

Figure 4A:
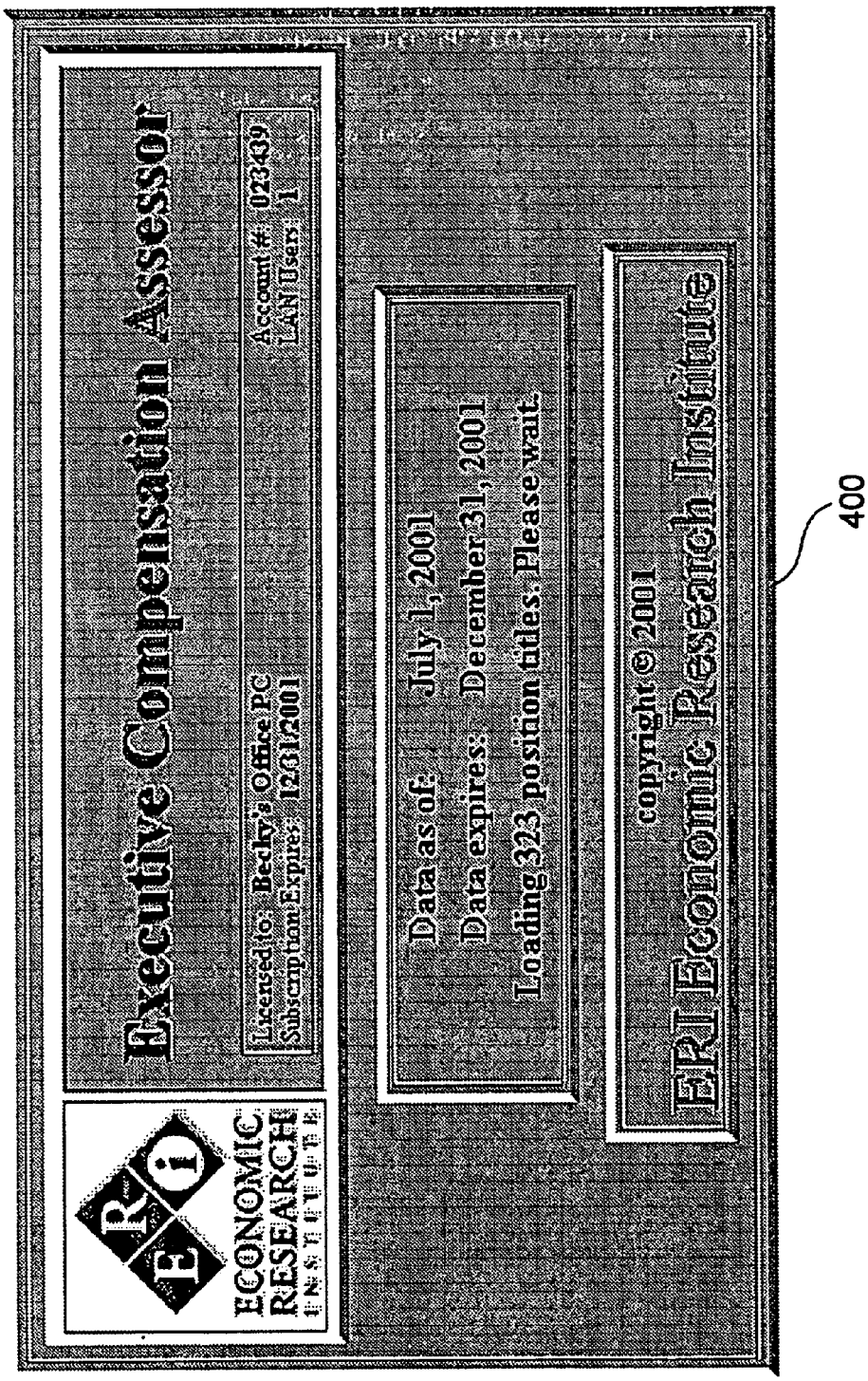
Figure 4B:
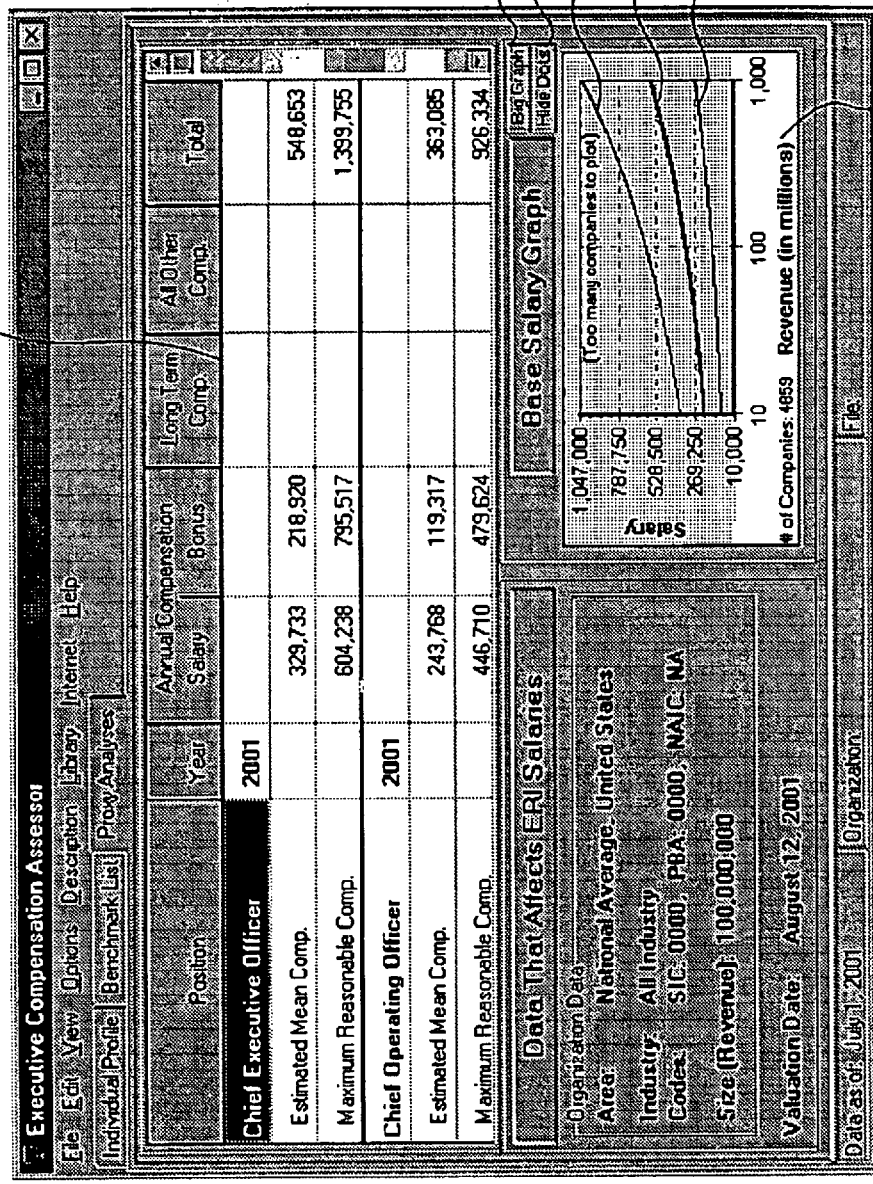
Figure 4C:
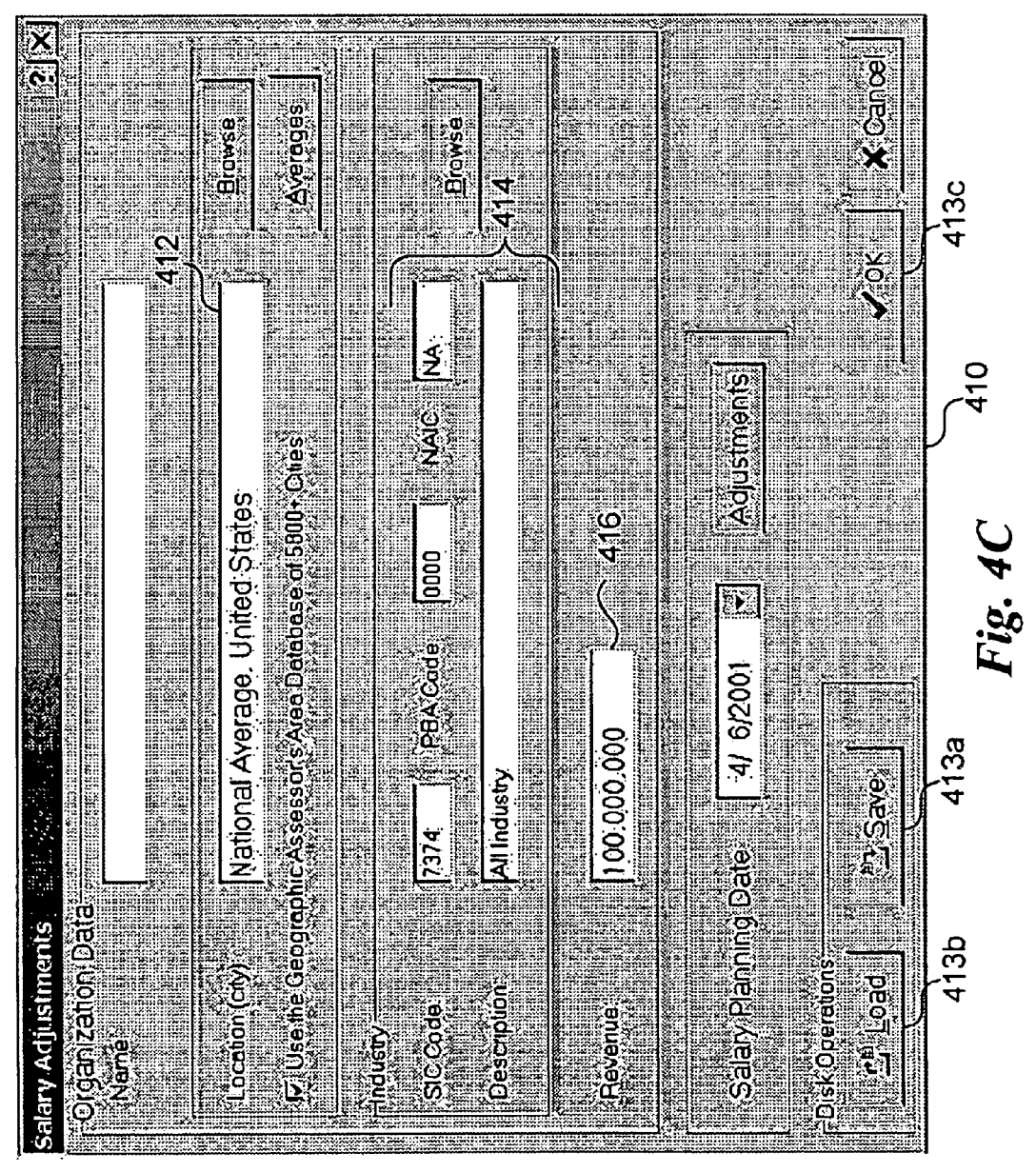

Beginning with step 302, the process 300 can include receiving input information or criteria at the client computer 102. For example, when the process 300 is performed by the Executive Compensation Assessor 148d, the user can initiate operation of the executive compensation assessor 148d and the system 100 can display an introductory page 400 (FIG. 4A). If the user provides no further inputs, the system 100 can retrieve default output data (step 304). In one aspect of this embodiment, the data can be retrieved from a CD or other computer-readable medium coupled directly to the computer 102. In other embodiments, the data can be retrieved from other sources, for example, the database 110 coupled to the server computer 108, via the Web 106. In either embodiment, the retrieved data is displayed to the user in step 306, on an output page 402 (FIG. 4B). The output page 402 can include a graph 404 of executive compensation or salary (along the y-axis) as a function of company revenue (along the x-axis). When the graph 404 is based on a large number of data points (for example, 5,437, as shown in FIG. 4B), the data can be presented in line graph form. Accordingly, the graph 404 can include a mean data line 406a, a high range line 406b, and a low range line 406c. The graph 404 can be enlarged by clicking on a Big Graph button 407a. When the graph 404 includes dots or points (described below with reference to FIG. 5A), these can be hidden by clicking on a Hide Dots button 407b.

The output page 402 can also include a table 408 displaying salary, bonus, and total compensation data for a variety of executive positions. In one embodiment, the table 408 can be ordered by position and/or year. Alternatively, the table can be ordered by salary, bonus, overall compensation or other variables.

In step 307, the user can filter or adjust the default data to be more specific. In one embodiment, the system 100 can display an adjustment input page 410 (FIG. 4C) and the user can adjust the input parameters on which the output data is based. For example, the user can enter one or more geographic locations in a location field 412, one or more industry types in industry fields 414, and/or midpoint company revenue value in revenue field 416. This information can be saved by clicking on a save button 413a and assigning the information to a dataset. The user can then create another set of filter parameters. Saved information can be retrieved by clicking on a load button 413b. The information can be submitted as a data request by clicking on an OK button 413c, at which point the system 100 can return an output page 402a (FIG. 4D) generally similar to the output page 402 described above but displaying a graph 404a and table 408a based on the adjusted input parameters received from the adjustment input page 410.

Figure 4D:
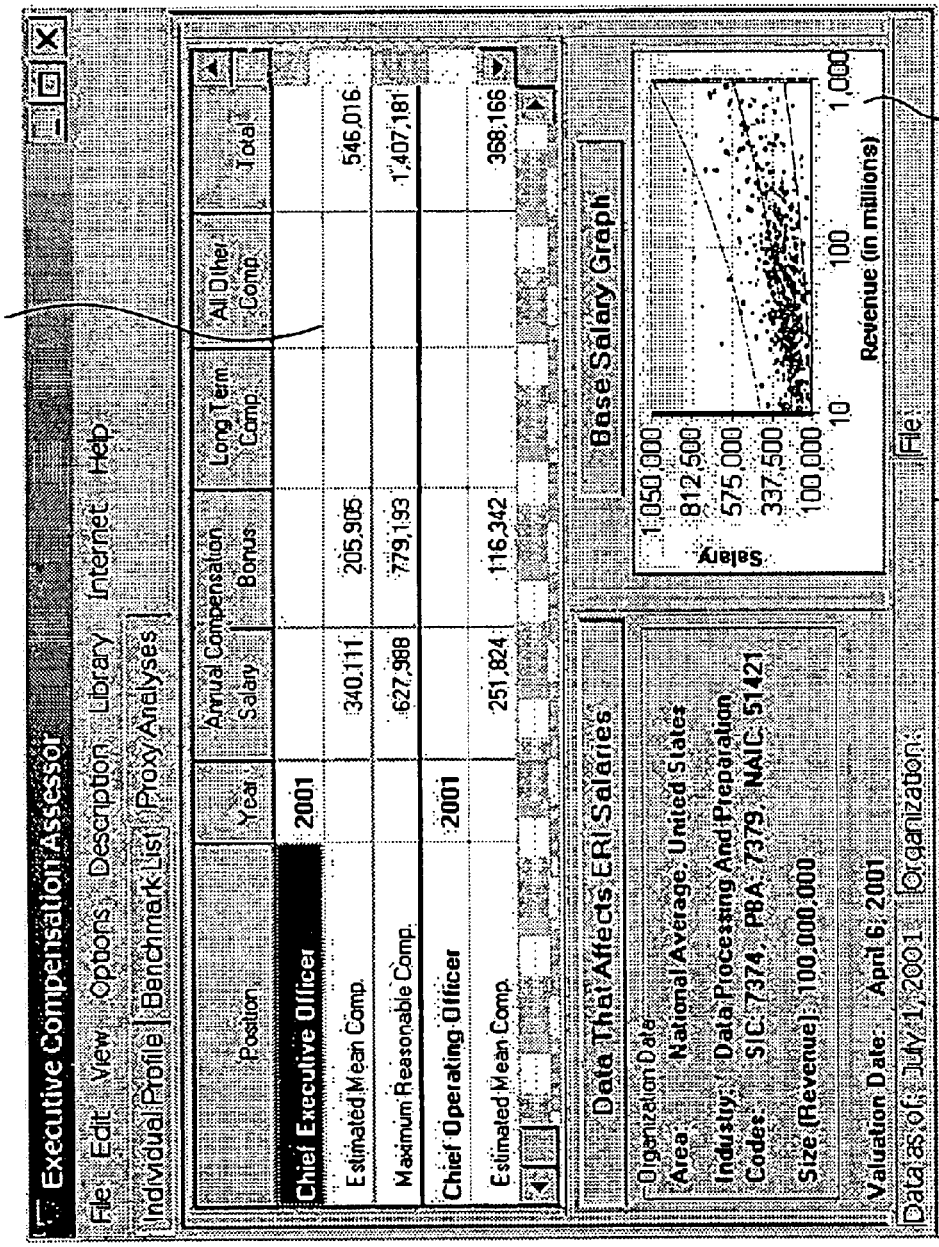
Figure 5A:
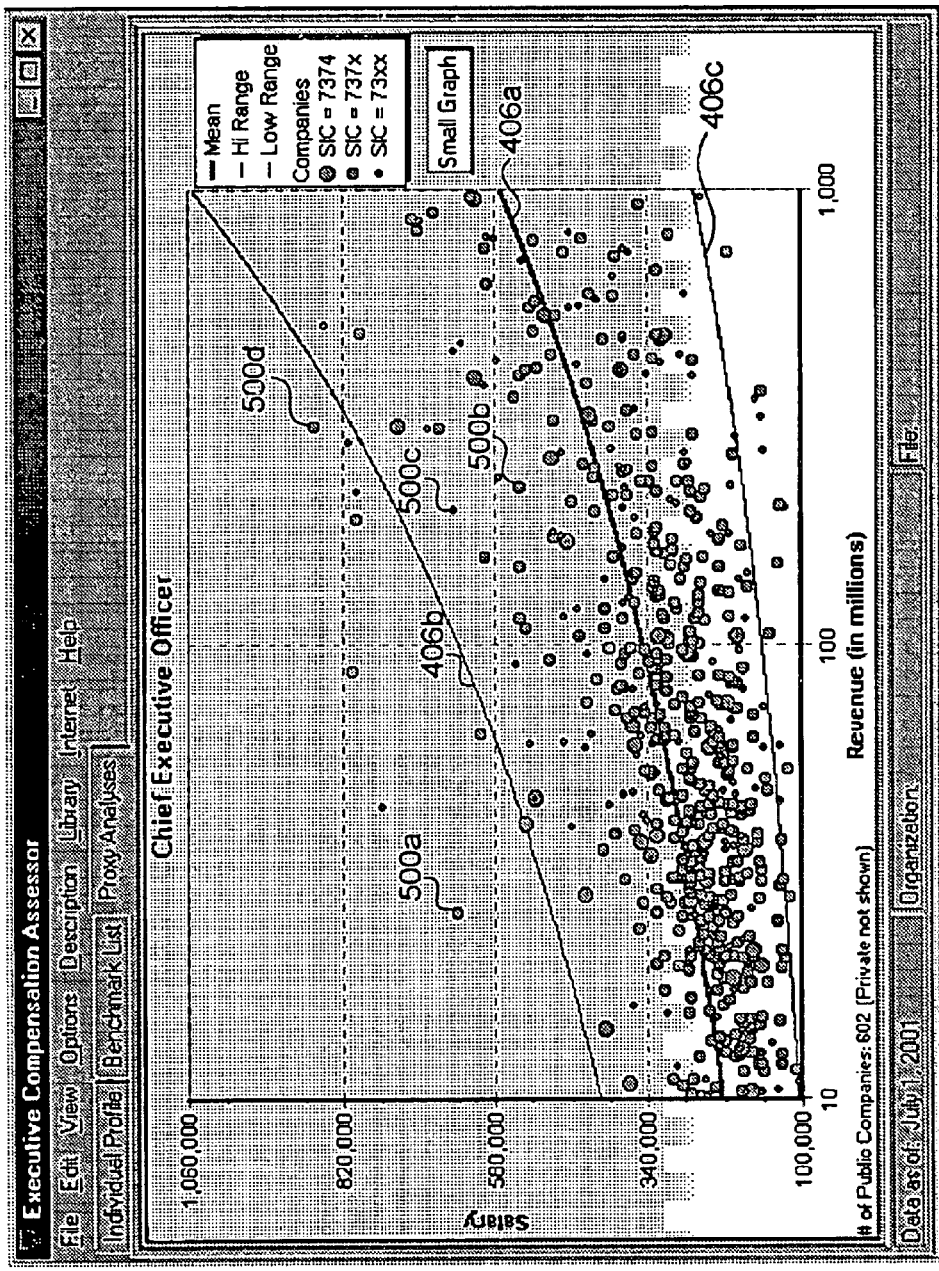
FIGS. 5A–G illustrate display descriptions for providing additional information relating to items of data in accordance with an embodiment of the invention.
Figure 5B:
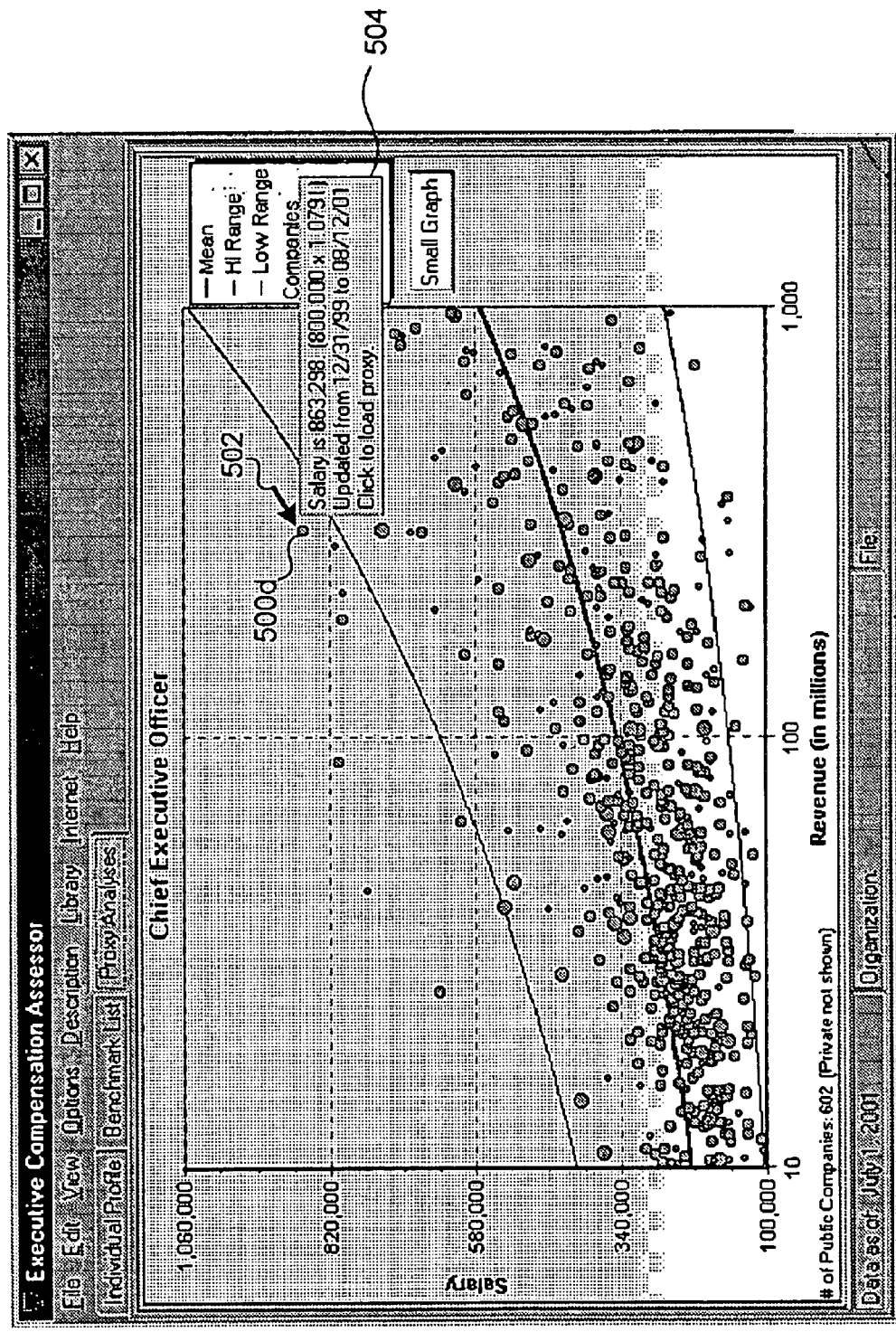

FIG. 5A is an enlarged illustration of the graph 404a shown in FIG. 4D. The graph 404a can include data points 500 (four of which are identified as data points 500a–d), as well as the lines 406a–c described above with reference to FIG. 4B. The size of the data points can correspond to the SIC (Standard Industrial Classification) code of the company, as indicated in FIG. 5A. In a further aspect of this embodiment, the user can elect to receive additional information pertaining to a particular one of the data points 500 shown in FIG. 5A. In step 308, the system 100 can receive the user's selection of one of the data points 500. For example, referring now to FIG. 5B, the system 100 can receive a signal when the user aligns a computer cursor 502 with a selected data point 500d. In step 310, the system 100 retrieves additional data specific to the selected data point 500d from either the client computer 102 or the server computer 108. The system then displays the additional data in step 312. For example, when the data point selected by the user corresponds to a point on the salary/company revenue graph shown in FIG. 5B, the additional data can include particulars about the company and the salary corresponding to the data point. In one embodiment, the additional data can include the precise value of the salary corresponding to the selected data point as shown in display field 504. Alternatively, the additional data shown in display field 504 can include the title of the executive position, the name of the executive in that position, the identity and location of the company or firm that pays the salary for that position or other related information.

Figure 5C:
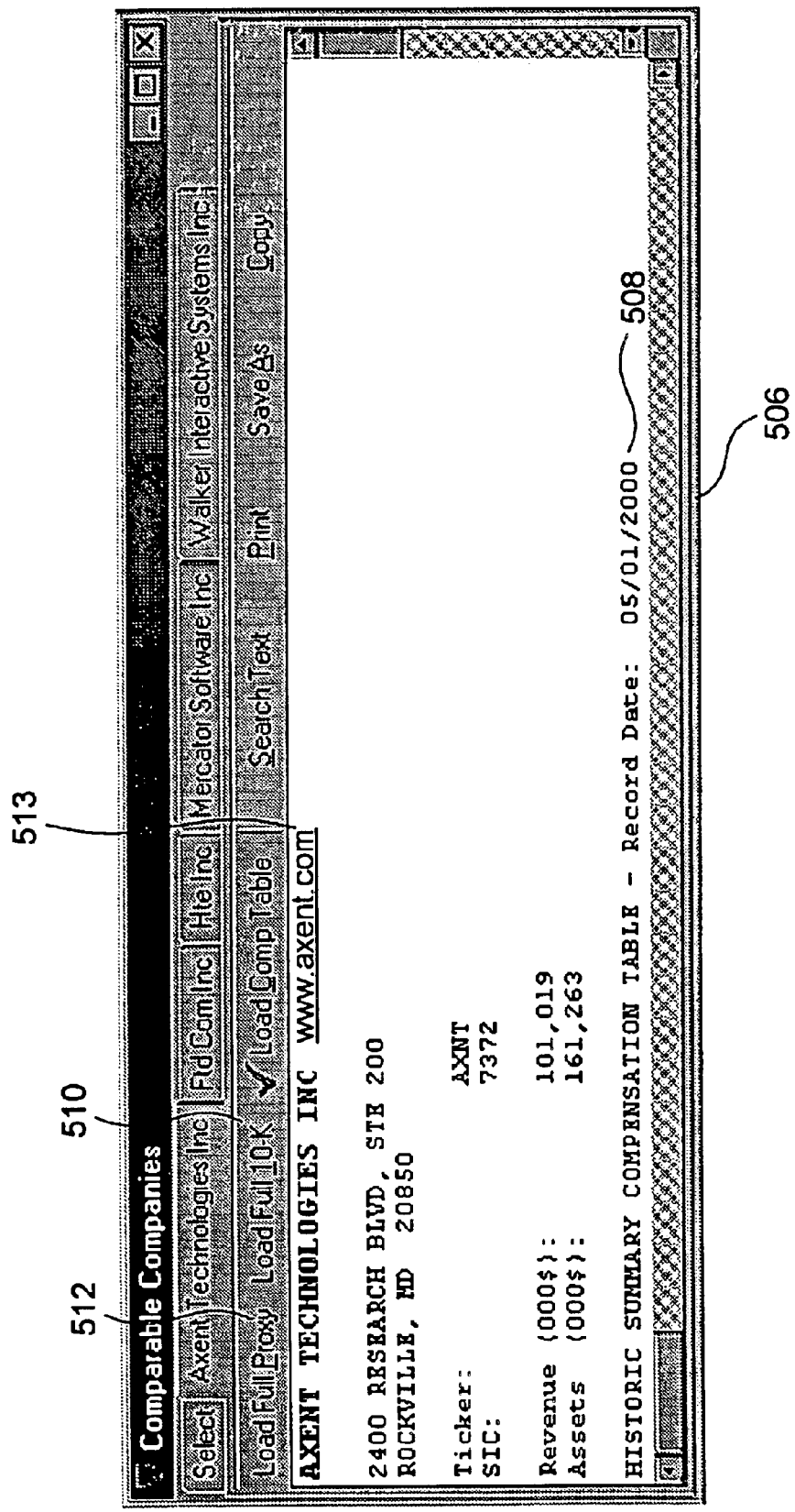

In a further aspect of this embodiment, some or all of the foregoing additional data can be displayed on a separate field that is not superimposed on the graph 404a. For example, as shown in FIG. 5C, the system 100 can display a summary compensation field 506 that includes a standard summary compensation table 508 (the heading of which is visible in FIG. 5C) extracted from a standard proxy statement provided by the company corresponding to selected data point 500d. In one aspect of this embodiment, the additional data (for example, the data shown in the summary compensation table 508) can be presented when the user takes an additional input step beyond aligning the cursor 502 (FIG. 5B) with the selected datapoint 500d. For example, in one embodiment, the user can click or double-click on the cursor 502 when the cursor 502 is aligned with the selected data point 500d. The action of double-clicking can bring up the summary compensation field 506. In another aspect of this embodiment, the page 506 can include a link 513 to the company's web site.

The user can also access still further detailed financial information pertaining to the company corresponding to the selected data point 500d. For example, by clicking on a "Load Full 10-K" input button 510 on the summary compensation field 506, the user can obtain information provided the selected company in a standard 10-K statement as described in greater detail below with reference to FIG. 5D. By clicking on a "Load Full Proxy" input button 512, the user can access the company's proxy information, as described in greater detail below with reference to FIGS. 5E–F. As used herein, the term "clicking" can refer specifically to striking an input button on a computer mouse, or generally to any input signal provided by the user to the computer.

Figure 5D:
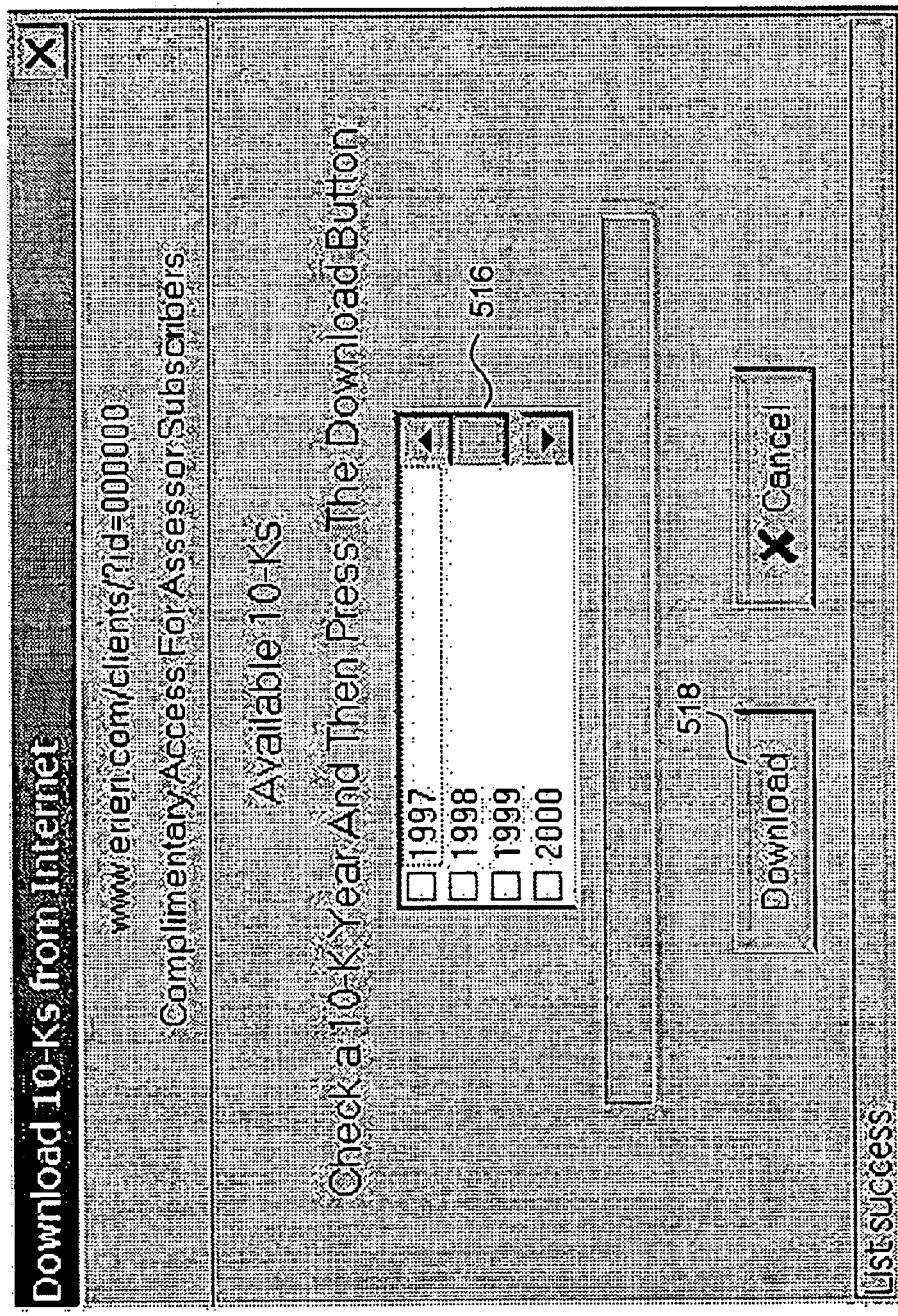
Figure 5E:
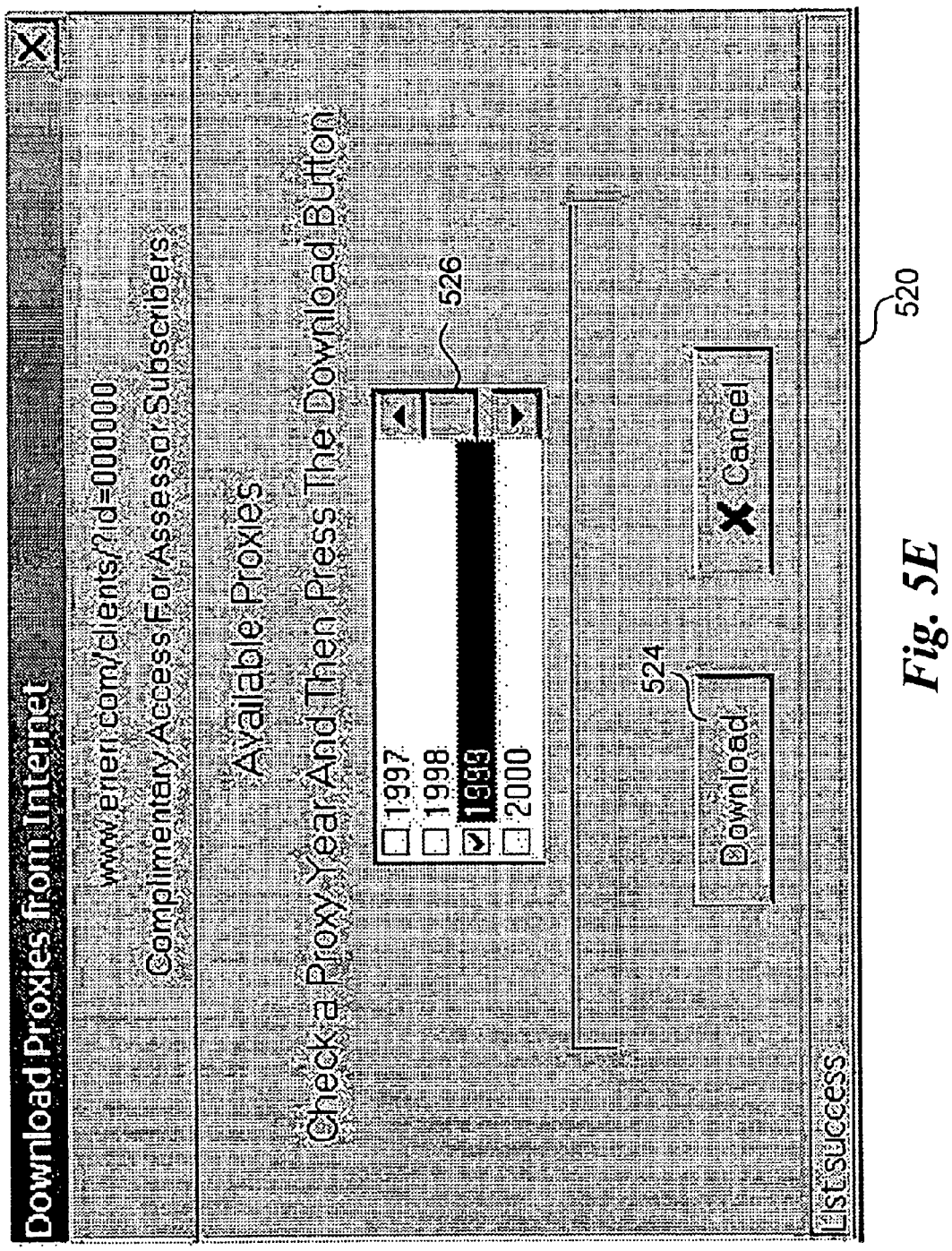
Figure 5F:
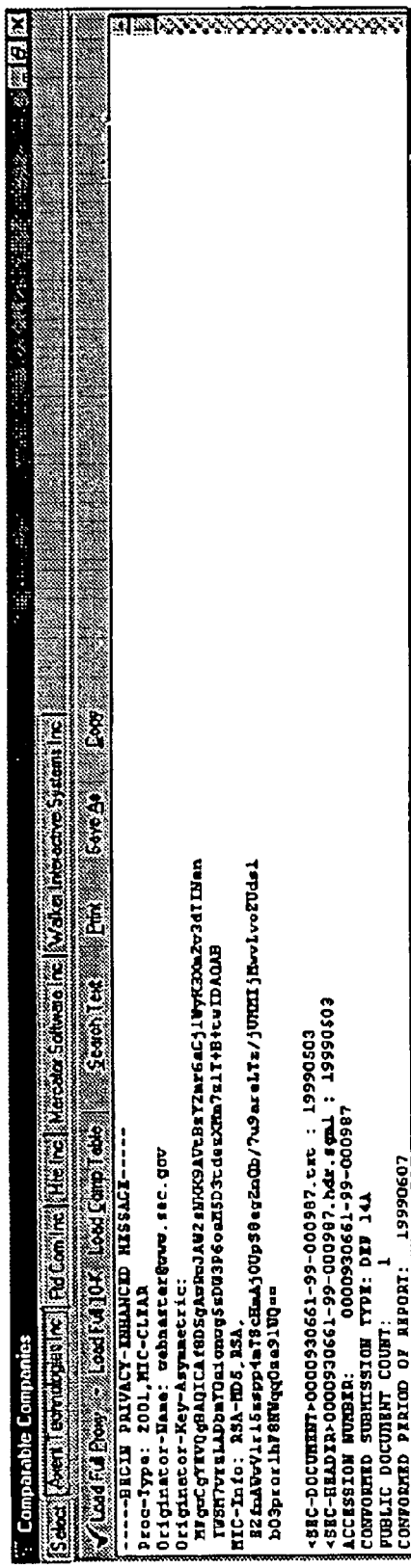

FIG. 5D illustrates an input window 514 that can appear when the user clicks on the Load Full 10-K input button 510 described above. The user can enter a year in a date field 516, then click on a download button 518 to receive the company's 10-K statement. As shown in FIG. 5E, the system 100 can present the user with a proxy input window 520 when the user clicks on the Load Full Proxy input button 512 (FIG. 5C). The user can select a proxy year in date field 522, and click on a download button 524 to receive a proxy statement 526, the header of which is shown in FIG. 5F. The proxy data, 10-K data and other SEC data are generally available, for example from sources such as freeEdgar.com. Accordingly, the data can be retrieved over the Internet, or from a local source, such as the database 110.

Figure 5G:
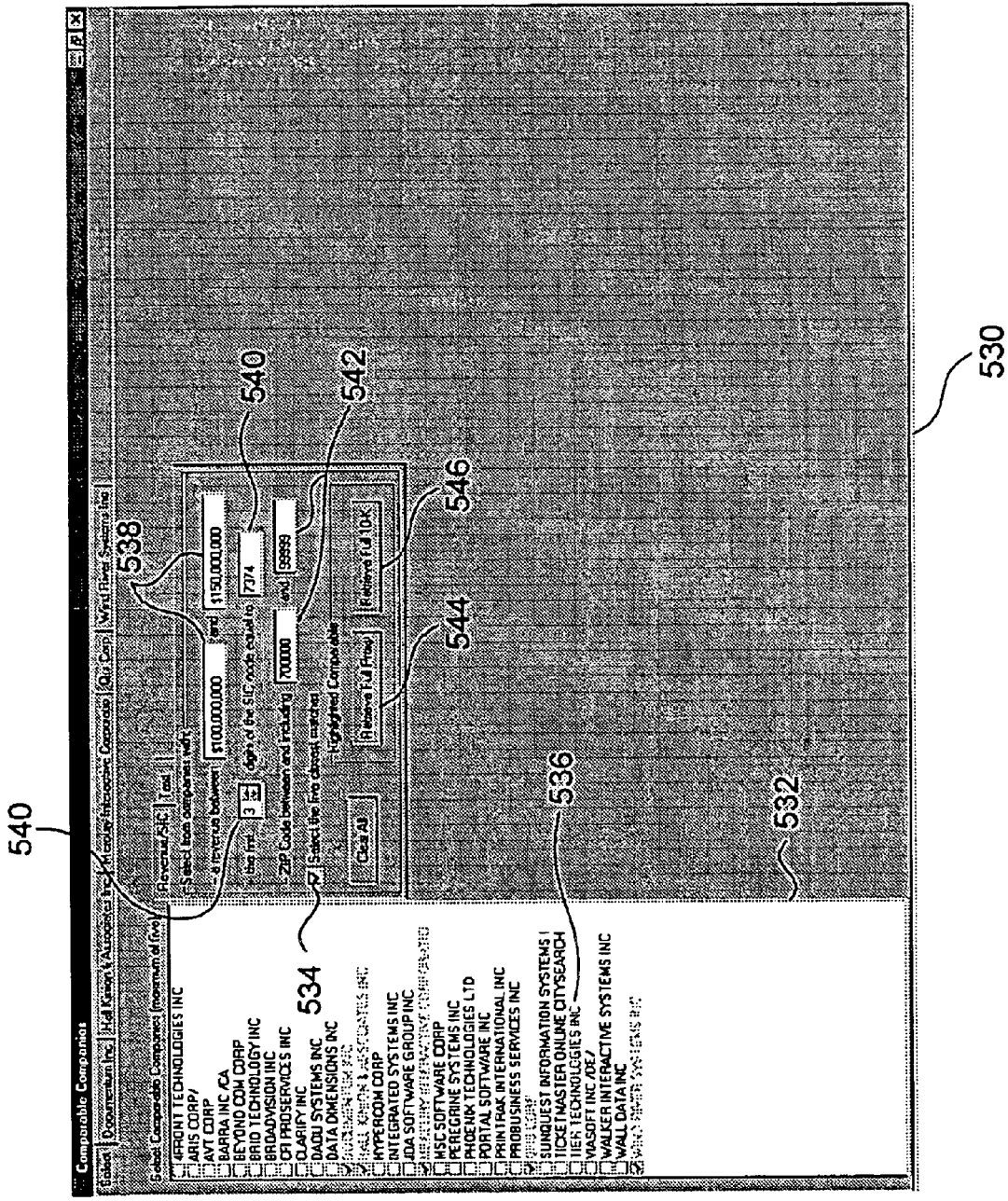

The system 100 can also display a comparable company page 530, shown in FIG. 5G. The comparable company page 530 can include a comparable company field 532 that includes a list of companies similar to the company corresponding to the selected data point 500d, based for example, on company revenue. The user can filter the information in the list 532 to narrow the number of selected comparable companies. For example, the user can click on field 534 to select the five closest companies based on company revenue, and indicated in list 532 with checkmarks. The list 532 can also highlight (for example, with a different color) the comparable company paying the highest executive compensation (indicated by numeral 536 in FIG. 5G). Alternatively, the user can narrow the list of comparable companies on the basis of revenue by entering information in revenue fields 538, or on the basis of business type by entering information in SIC fields 540, and/or by geographical location by entering information in fields 542. In other embodiments, the user can filter the data according to other parameters. In any of these embodiments, the user can then retrieve full proxy information and/or full 10-K information by clicking on the appropriate buttons 544 and 546, respectively. The user can also receive summary compensation information for the comparable companies, which is generally similar to that shown in FIG. 5C.

The process 300 can have other arrangements in other embodiments. For example, steps generally similar to steps 302–312 can be performed by any or all of the other Assessors 148a–148c and 148e. In other embodiments, the data can be displayed in forms other than the graph described above with reference to FIGS. 5B and 5D (for example, a histogram, bar graph, pie chart, or other graphical display), so long as the user can identify to the system 100 specific discrete elements of data, and the system 100 can provide additional information corresponding to those discrete elements.

Figure 6:
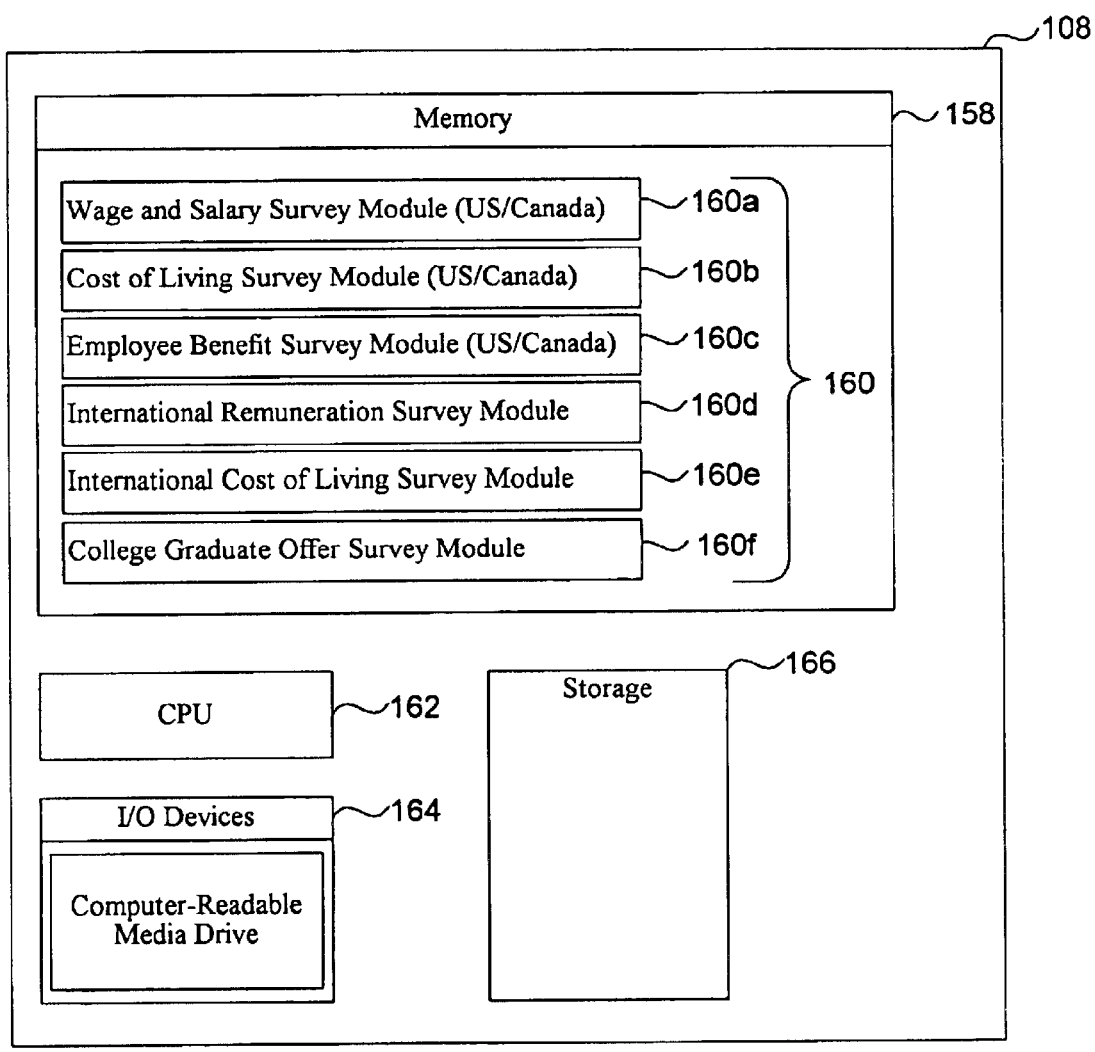
FIG. 6 is a schematic block diagram illustrating components of the server computer shown in FIG. 1 in accordance with an embodiment of the invention.

FIG. 6 is a schematic block diagram illustrating components of the server computer 108 described above with reference to FIG. 1 in accordance with an embodiment of the invention. In one aspect of this embodiment, the server computer 108 can include a memory 158, a CPU 162, input/output devices 164, and a storage device 166. The memory 158 can include software or other computer instructions for implementing a method in accordance with an embodiment of the invention. For example, the software can include a plurality of survey modules 160, including a wage and salary survey module 160a for providing wage and salary data for a particular position in a particular geographical area, a cost of living survey module 160b for providing cost of living data for a particular area, and an employee benefit survey module 160c for providing employee benefit data for a particular geographical area. The software can also include an international remuneration survey module 160d for providing international incentive and salary data, an international cost of living survey module 160e for providing international cost of living data, and a college graduate offer survey module 160f for providing starting salary information in a particular geographical area for college graduates having a degree from a particular institution in a particular discipline.

In one embodiment, the survey modules 160 not specifically identified above as "international" provide data for the U.S. and Canada and the remaining survey modules 160 provide data for other countries. Alternatively, the survey modules 160 can have other geographically based arrangements. In any of these embodiments, the survey modules 160 can be configured to both provide and receive economic data, and can provide an incentive for users to supply economic data, as described in greater detail below with reference to FIGS. 7–13C.

Figure 7:
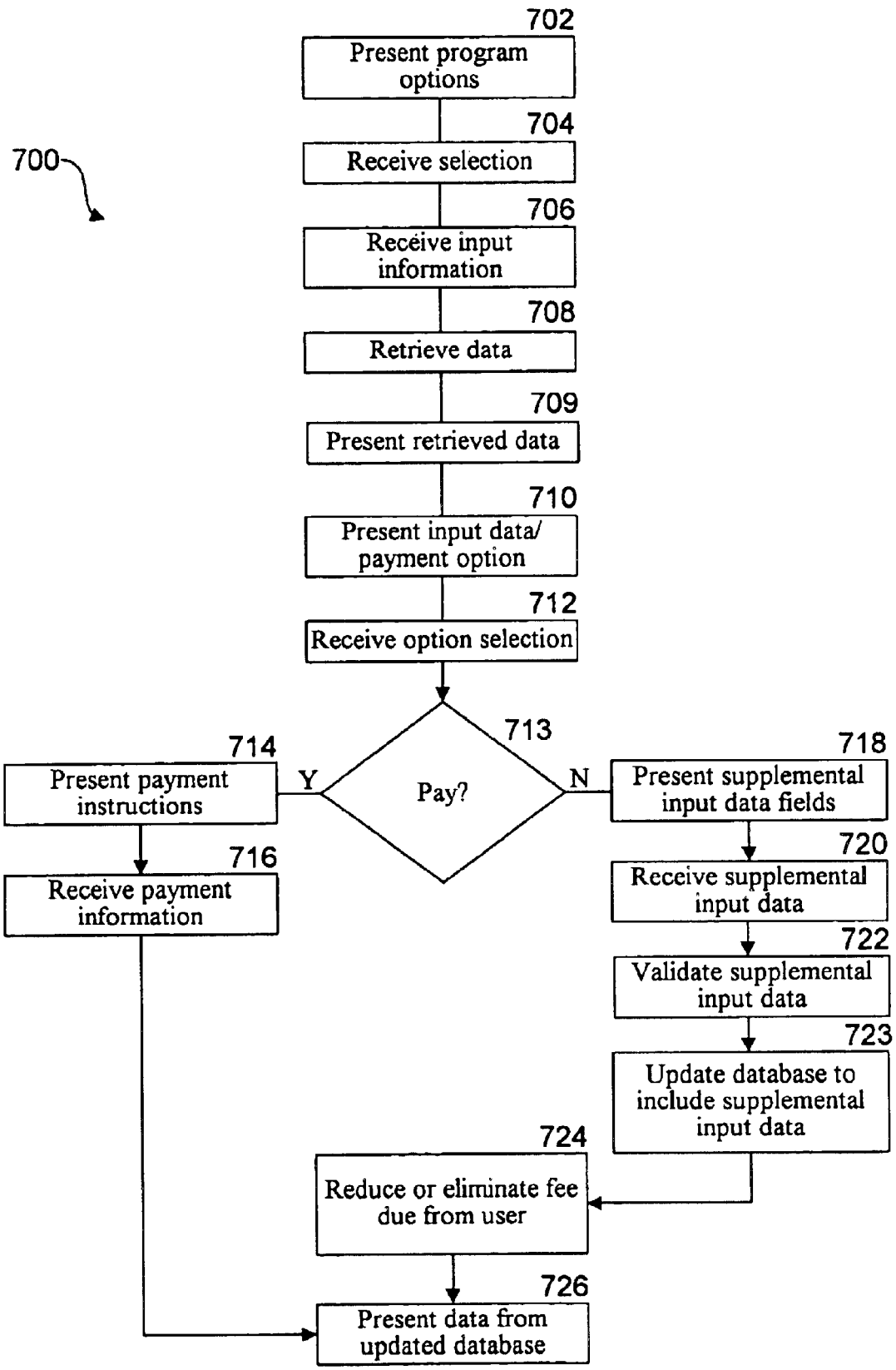
FIG. 7 is a flow diagram of a representative implementation of another retrieval and display process performed by components of the system shown in FIG. 6 in accordance with an embodiment of the invention.

FIG. 7 is a flow diagram of a representative information search, retrieval, and update process 700 performed by the system 100 (FIG. 1) and one or more of the assessors 160. FIGS. 8A–D are display pages provided by the wage and salary survey module 160a running on the server computer 108 and provided to the client computers 102 in accordance with an embodiment of the invention. Accordingly, the following discussion refers both to the process steps shown in FIG. 7 and the corresponding display pages shown in FIGS. 8A–D.

Figure 8A:
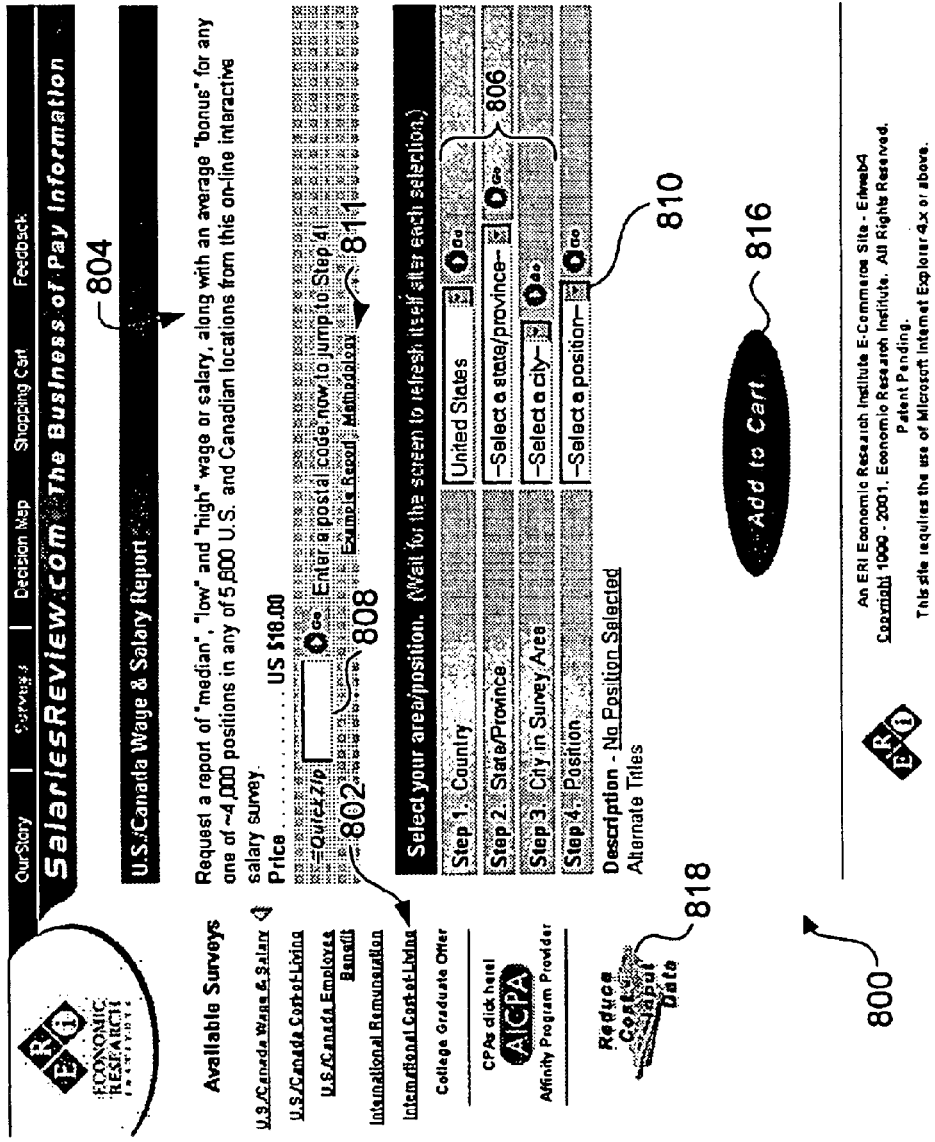

In step 702, the system 100 can present a variety of survey module options to a user, for example, over a network such as the Web 106. FIG. 8A illustrates an input selection page 800 with available survey module options displayed in an option field 802. In step 704, the system 100 receives the user's module selection (such as "U.S./Canada Wage & Salary") and displays an appropriate input request field 804.

In step 706, the system 100 receives the user's input request information. For example, when the user selects the wage and salary survey module 160a, the input information can include a geographical location. The user can enter the desired country, state, and city in the appropriate input fields 806, or simply enter a postal code in field 808. The user can also select a position title in field 810, for example, from a pop-up list provided by the system 100. If desired, the user can click on a methodology icon 811 to receive information on how the output data is computed. The system 100 then retrieves data (step 708) corresponding to the input information. In step 709, the system 100 can present the retrieved data to the user. For example, when the user selects the wage and salary survey module 160a, the system 100 can retrieve salary data corresponding to the position, title and geographical data received in step 706. Sample data are shown in display pages 812 and 814 of FIGS. 8B and 8C, respectively.

In step 710, the system 100 can present to the user the option of paying for the retrieved data (represented by an "Add to Cart" icon 816 in FIG. 8A) or inputting supplemental data to receive the retrieved data for free or at a discount in exchange for input data, an option represented by a "Reduce Cost-Input Data" icon 818. In other embodiments, the icons 816 and 818 can have other forms. In either embodiment, the system 100 receives the option selected by the user in step 712 and determine whether or not the user has elected to pay in step 713. For example, if the user clicks on the "Add to Cart" icon, the user will be prompted for payment instructions (step 714). The system 100 then receives payment information (such as a credit card number and expiration date) in step 716.

If the user elects to input supplemental data, the system 100 presents supplemental input data fields to the user (step 718). For example, if the user is accessing the wage and salary survey module 160a, the system can display an input page 820, shown in FIG. 8D. The input page 820 can include input data fields 822 for the user's location, an input field 824 for the user's position, an input field 826 for the user's e-mail address, an input field 828 for the user's years of experience in the position, an input field 830 for the user's annual salary, and an input field 832 for the user's current bonus or incentive payment. The user enters this supplemental input data, and the supplemental data is received in step 720 by the system 100 when the user clicks on a "submit data" button 834.

In step 722, the system 100 can validate the supplemental input data, for example, by determining whether the input data is within two standard deviations of the mean for similar data already in the database 110 for the same position and geographical area identified by the user. Accordingly, the system 100 can select from the database 110 data that is averagable with the supplemental input data, calculate a mean and standard deviation for the data, and then determine whether the supplemental input data is within two standard deviations of the mean. In other embodiments, the system 100 can determine data validity by other methods, or the validation step can be eliminated. In step 823, the system 100 can update the database 110 to include the supplemental data input by the user in step 520.

In step 724, the system 100 can reduce or eliminate any fee due from the user for receiving the data presented in step 710. For example, in one embodiment, the system 100 can automatically eliminate the fee due from the user once the supplemental input data received in step 720 has been determined to be valid in step 722. In an alternate embodiment, the system 100 can assign a first value to the data presented to the user in step 709, assign a second value to the data received from the user in step 720, and subtract the second value from the first value to determine an amount due from the user. In a further aspect of this embodiment, the data received from the user in step 720 can be similar to the data presented to the user in step 709. For example, both types of data can pertain to salary data handled by the wage and salary survey module 160a. In an alternative embodiment, the user can receive data from one survey module 160 and provide data handled by another survey module 160.

In any of the foregoing embodiments, data originally requested by the user in step 706 can be automatically updated (to include the supplemental data input by the user in step 720) and presented to the user in step 726. Alternatively, if the same user or a different user subsequently requests data from the database 110 in a separate request, the data retrieved from the database 110 can be based in part on the supplemental data received by the server 108 from the user in step 720. In either embodiment, the addition of the supplemental data can be reflected by updating a population field 813, shown in FIG. 8B.

An advantage of an embodiment of the arrangement described above with reference to FIGS. 4–5 is that the user can avoid paying for economic data by providing supplemental economic data in return. A further advantage is that the database accessed by the user can be immediately updated to include the supplemental data. Accordingly, the data subsequently retrieved by the same user or a different user can be based in part on the user's own economic data.

In another embodiment, the process 700 described above with reference to FIGS. 6 and 7 can be used by data collectors (as opposed to clients) to update the database 110. For example, a data collector in the field can use the process 700 to input additional data collected in the field, and can immediately access data that includes the supplemental input data he just provided.

Figure 9A:
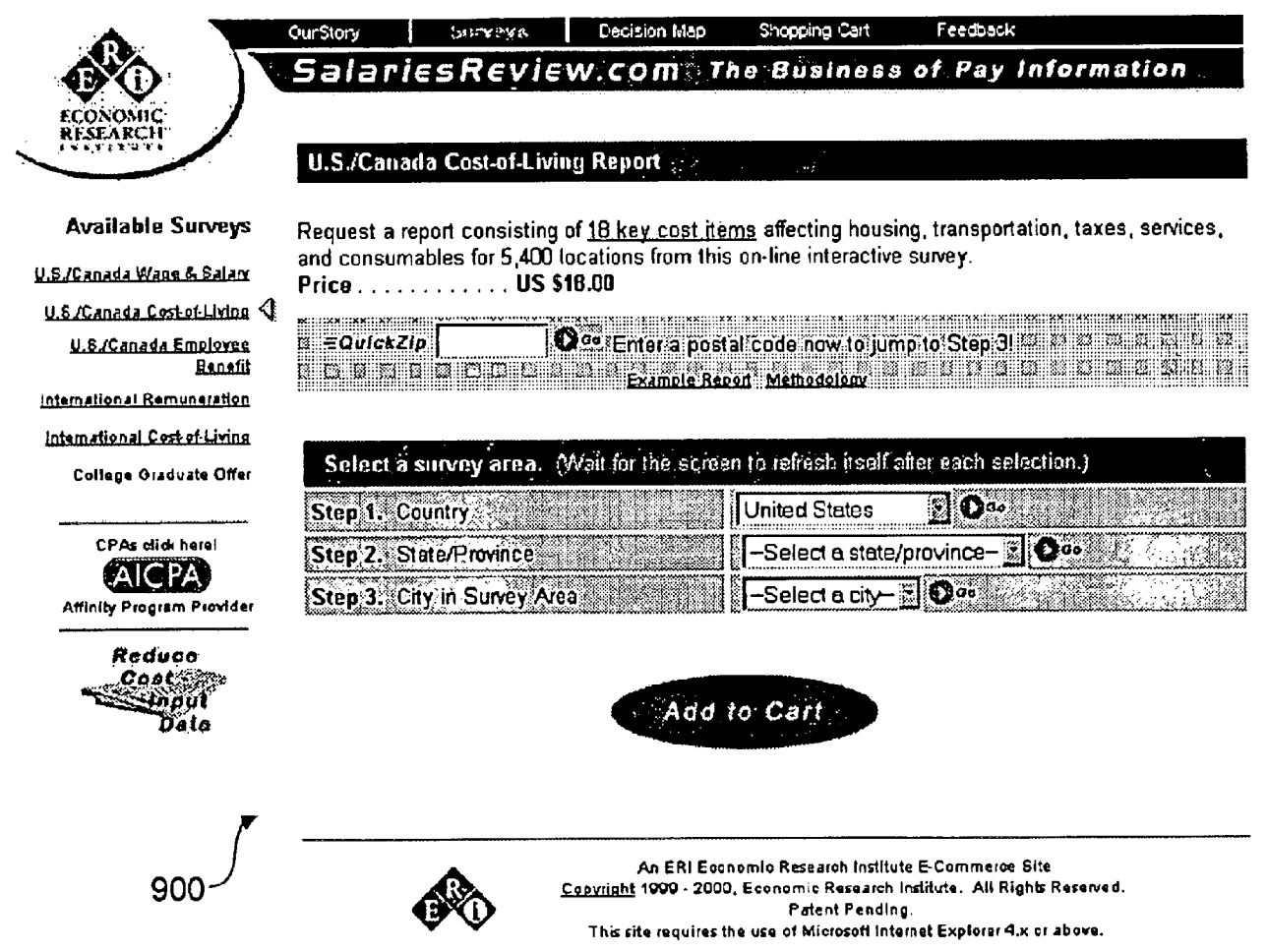
Figure 9E:
Figure 10A:
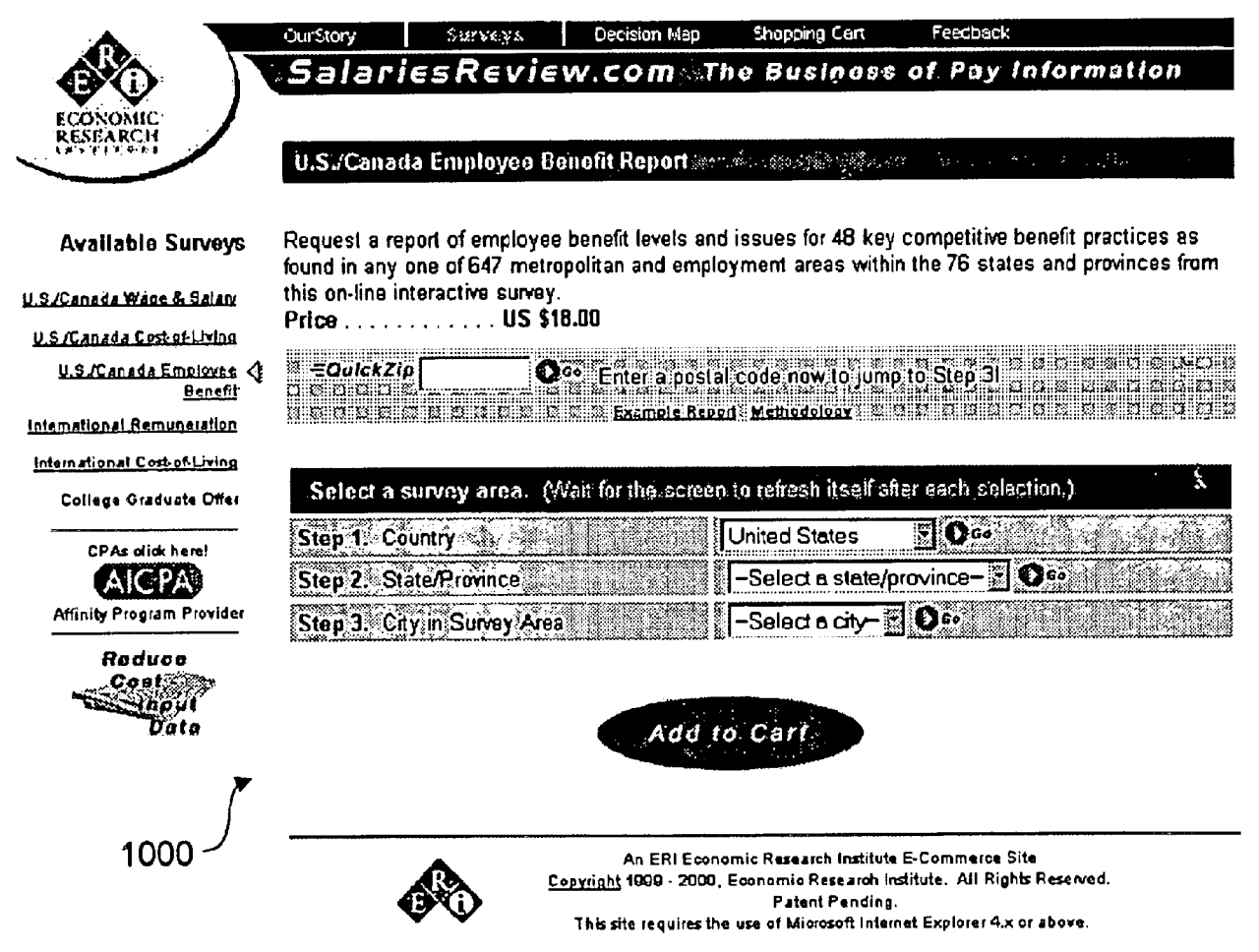
Figure 10D:
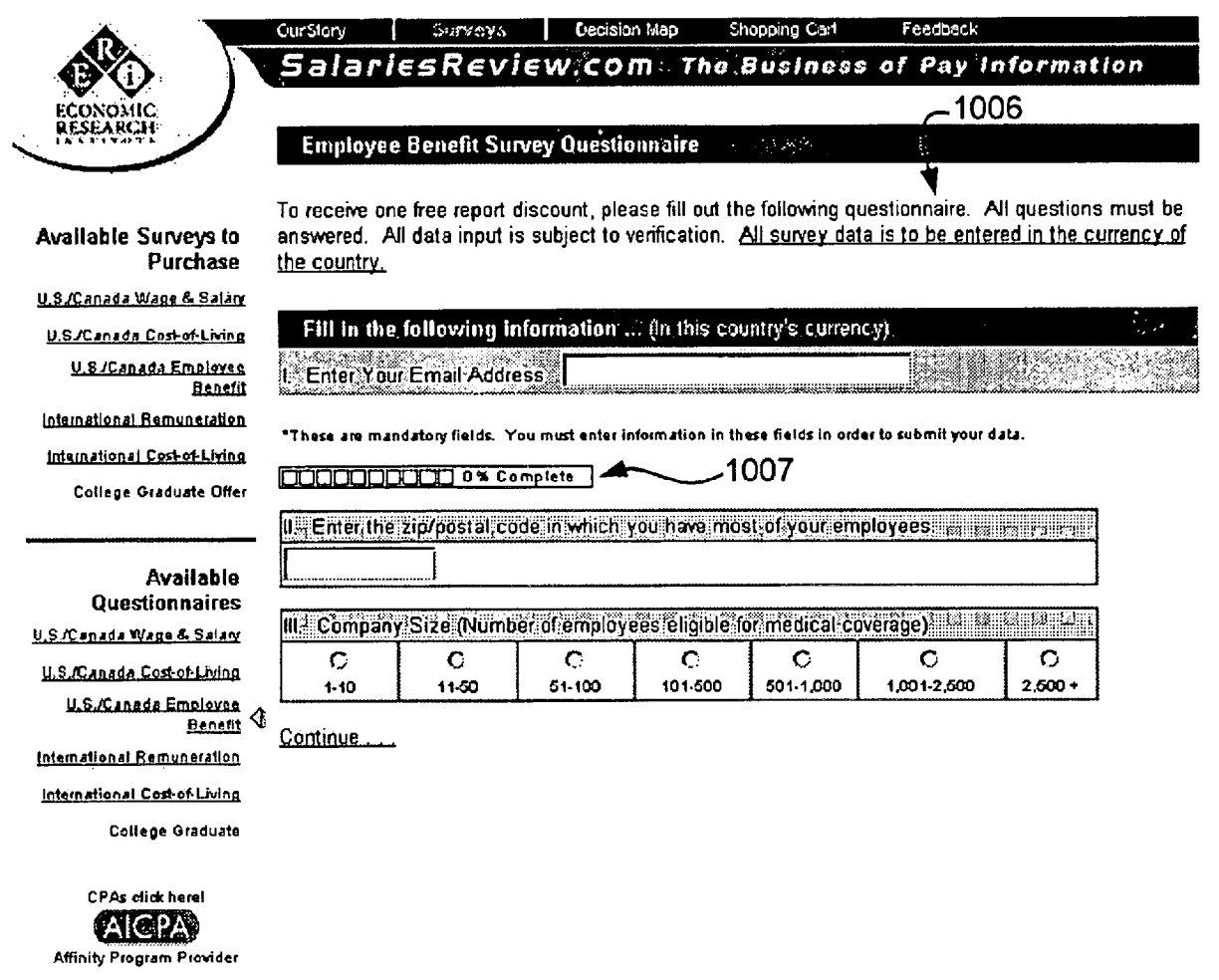
Figure 11A:
Figure 11B:
Figure 11D:
Figure 12A:
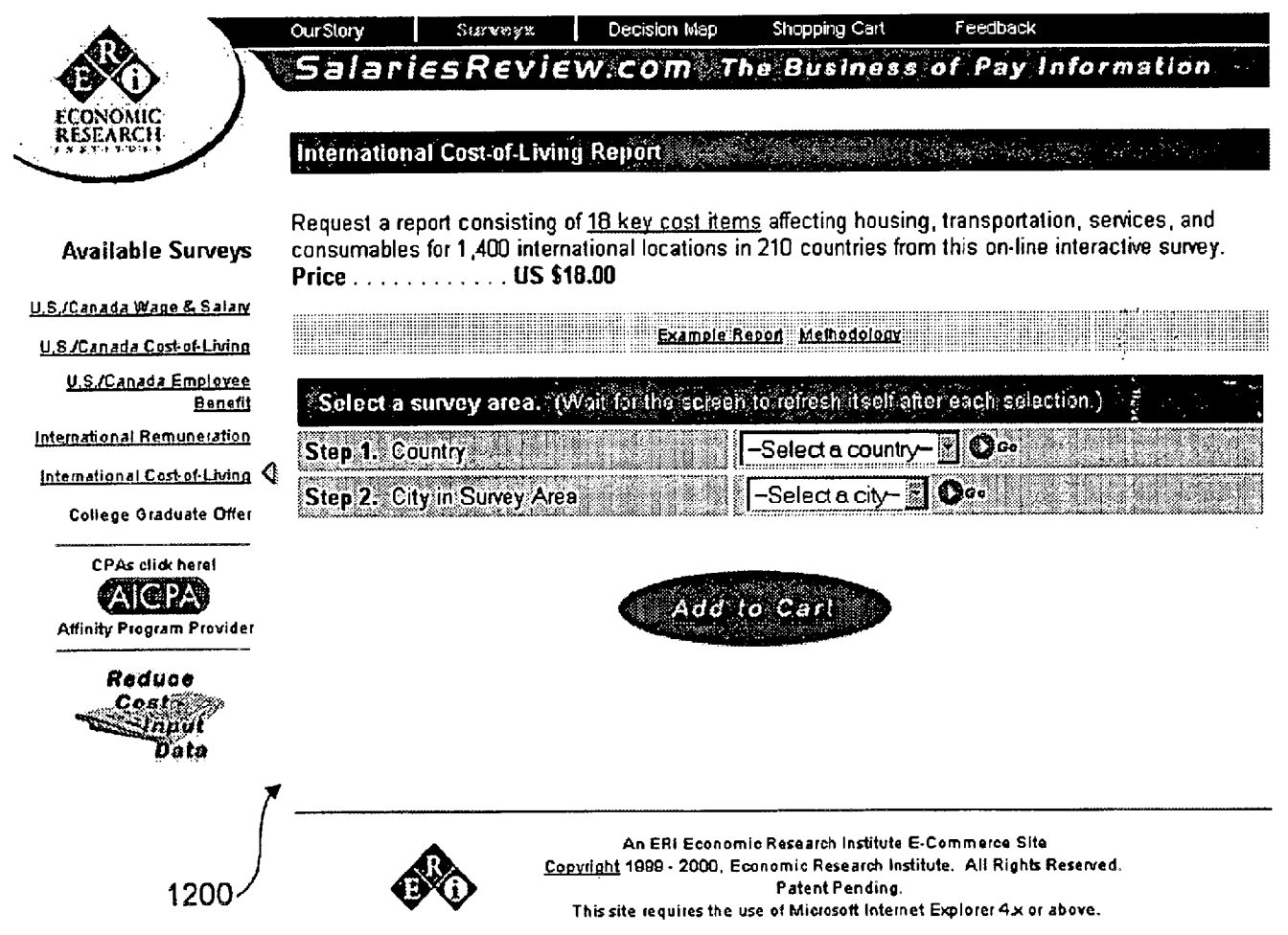
Figure 12B:
Figure 12E:
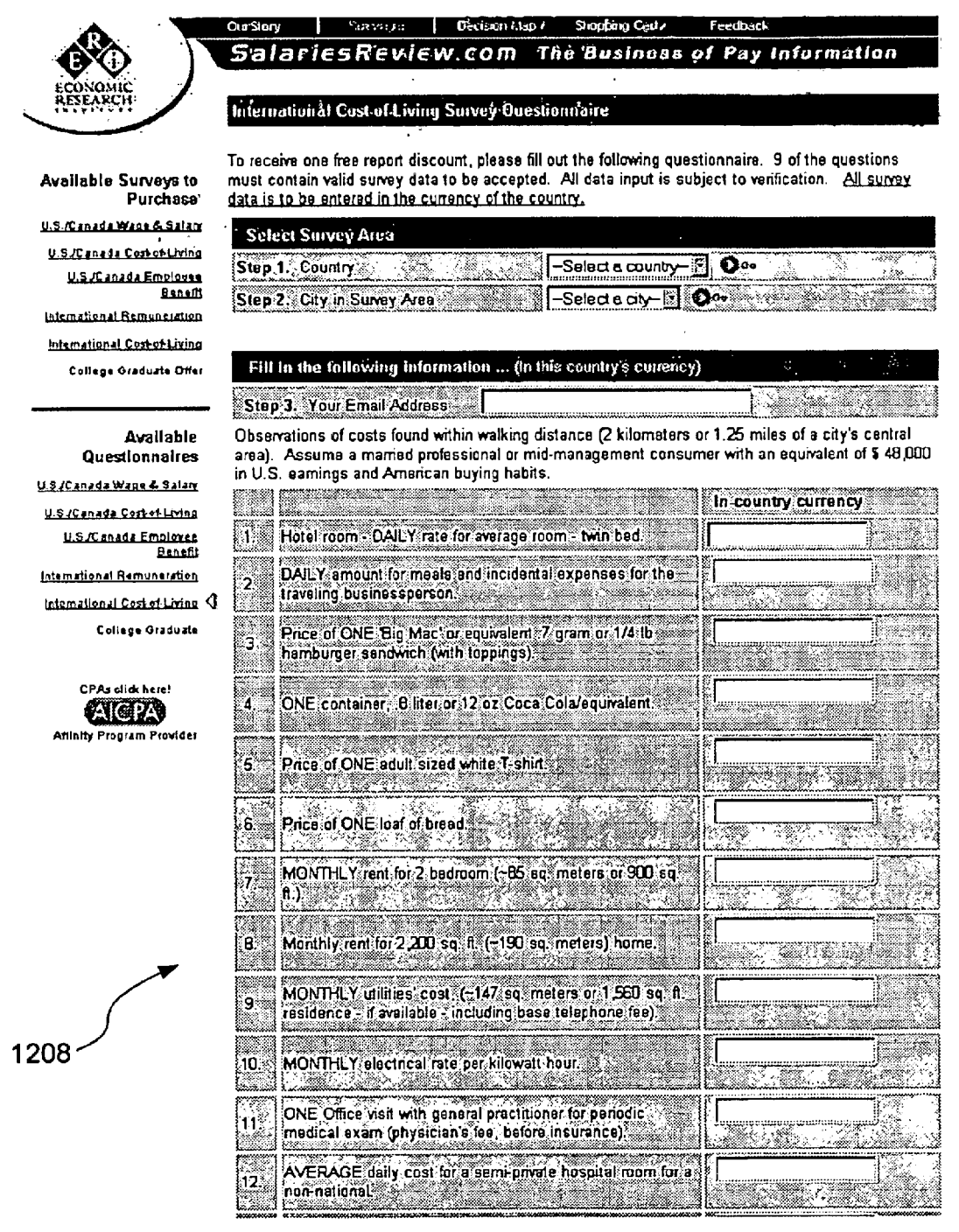
Figure 12F:
Figure 13A:
Figure 13B:
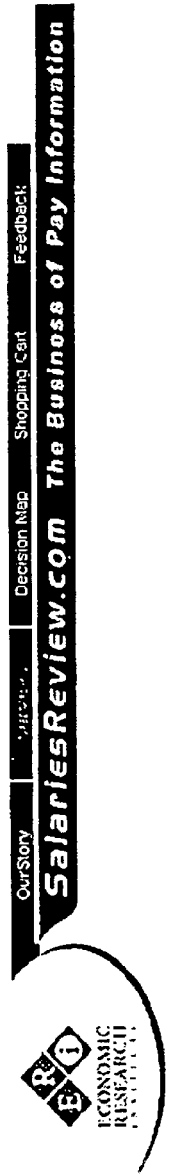

In other embodiments, the process 700 can be used in other contexts, and can be used in connection with the survey modules 160b–160f (or other modules), as described below with reference to FIGS. 9A–13C. Each display description shown in these Figures includes self-explanatory text describing aspects of the input and output fields shown thereon. For example, FIG. 9A illustrates an input request field 900 corresponding to an embodiment of the cost of living survey module 160b. FIGS. 9B–D illustrate a single output display page having sample output data fields 902, 904 and 906, respectively, corresponding to the cost of living survey module 160b. FIGS. 9E and 9F illustrate a single page having sample supplemental input data request fields 908 and 910 for receiving supplemental input cost of living data in accordance with an embodiment of the invention. FIG. 10A illustrates a sample input request page 1000 for an embodiment of the employee benefit survey module 160c. FIGS. 10B and 10C illustrate a single display page having corresponding output data fields 1002 and 1004 for the employee benefit survey module 160c. FIGS. 10D–H illustrate corresponding supplemental input data request fields 1006–1020, for receiving supplemental input employee benefit data. A "% complete" indicator 1007 (FIG. 10D) can be periodically updated by the system 100 to indicate to the user how much of the required input data has been entered.

The international remuneration survey module 160d, the international cost of living survey module 160e, and college graduate offer survey module 160f can have arrangements generally similar to those of the survey modules described above with reference to FIGS. 8A–10H. For example, as shown in FIGS. 1A–D, the international remuneration survey module 160d can display an input field 1100 (FIG. 1A) for receiving an input request, output fields 1102 and 1104 (FIGS. 11B and 11C) for displaying output international remuneration data, and a supplemental data input field 1106 (FIG. 11D) for receiving supplemental input international remuneration data. The international cost of living survey module 160e can display an input request field 1200 (FIG. 12A) for receiving an input request, data output fields 1202–1206 (FIGS. 12B–12D) for displaying output international cost of living data, and supplemental input data fields 1208–1210 (FIGS. 12E and 12F) for receiving supplemental input international cost of living data. The college graduate offer survey module 160f can display an input data request field 1300 (FIG. 13A) for receiving an input request, data output fields 1302–1304 (FIGS. 13B and 13C) for displaying output graduate data and a supplemental input data field (not shown).

In still another embodiment, the Assessors 148 described above with reference to FIGS. 2–5G can be installed on the client computer 102 and can access the survey modules 160 over a network such as the Web 106. For example, the Geographic Assessor 148c (which requires a salary and the city corresponding to the salary as input) can retrieve survey data over the Web 106 indicating what the corresponding salary would be in another city (based on, for example, the difference in the cost of labor between the two cities). In one aspect of this embodiment, the data can be based on a plurality of salary surveys. In another embodiment, the user can request that the data be based on a single survey, for example, to comply with General Accounting guidelines, such as GA Letter 2–98. The single survey can be accessed by the Geographic Assessor 148c locally, for example via a CD, or externally via the Web 106, as described below with reference to FIGS. 14A–C.

Figure 14A:
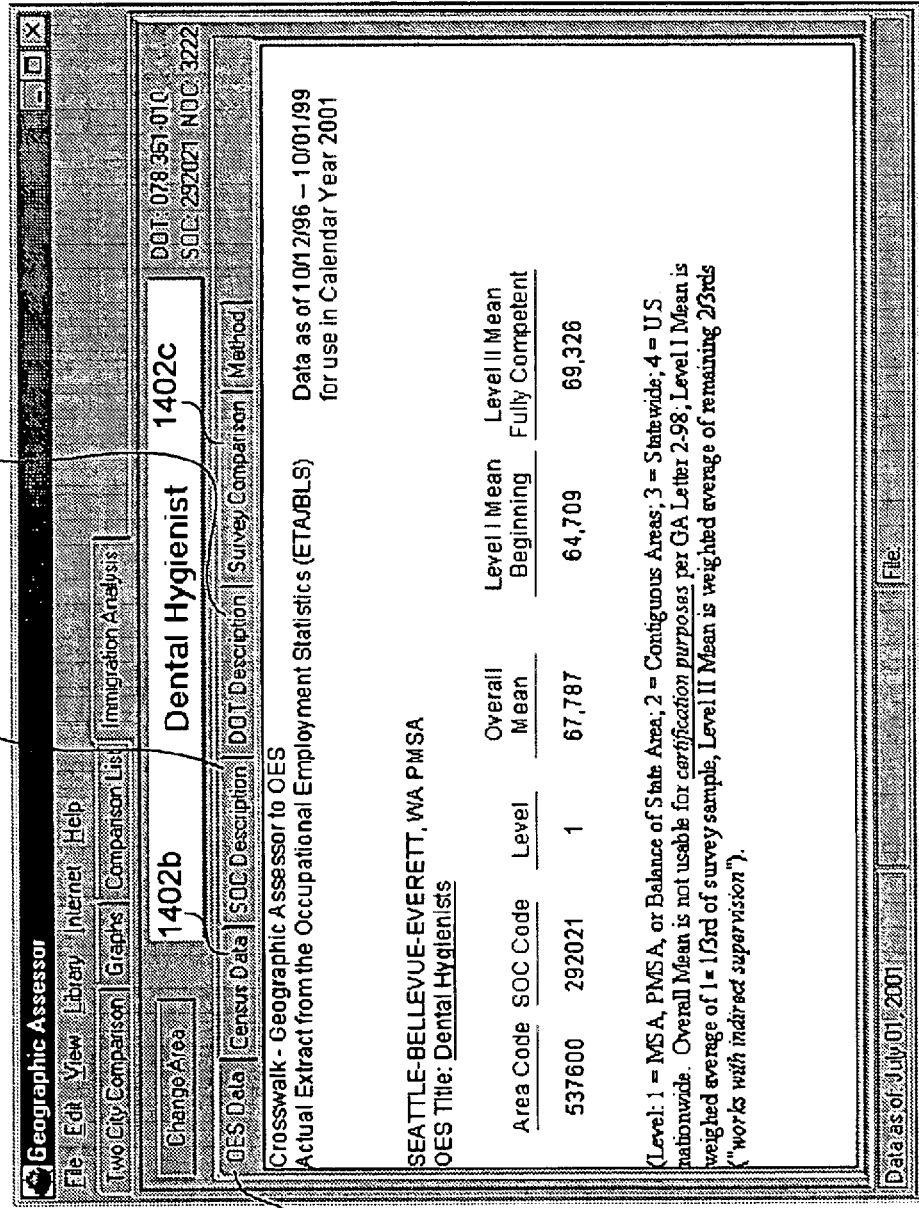
Figure 14B:
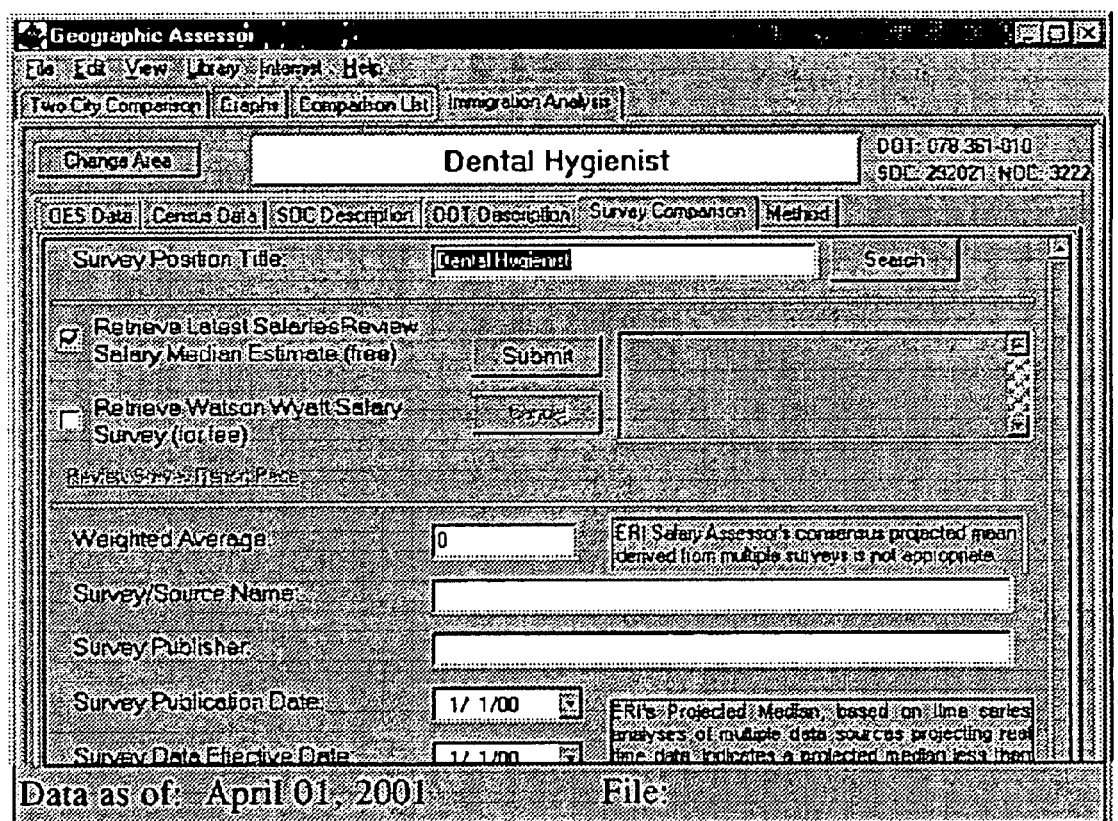

FIG. 14A illustrates an output data field 1400 displayed by the Geographic Assessor 148c to the user in accordance with an embodiment of the invention. The data shown in FIG. 14A are obtained from a U.S. Government Occupational Employment Statistics (OES) in response to a request for salary information for a dental hygienist position in the Seattle area. The data show OES Level I, Level II and mean values for the dental hygienist position selected by the user.

Figure 14C:
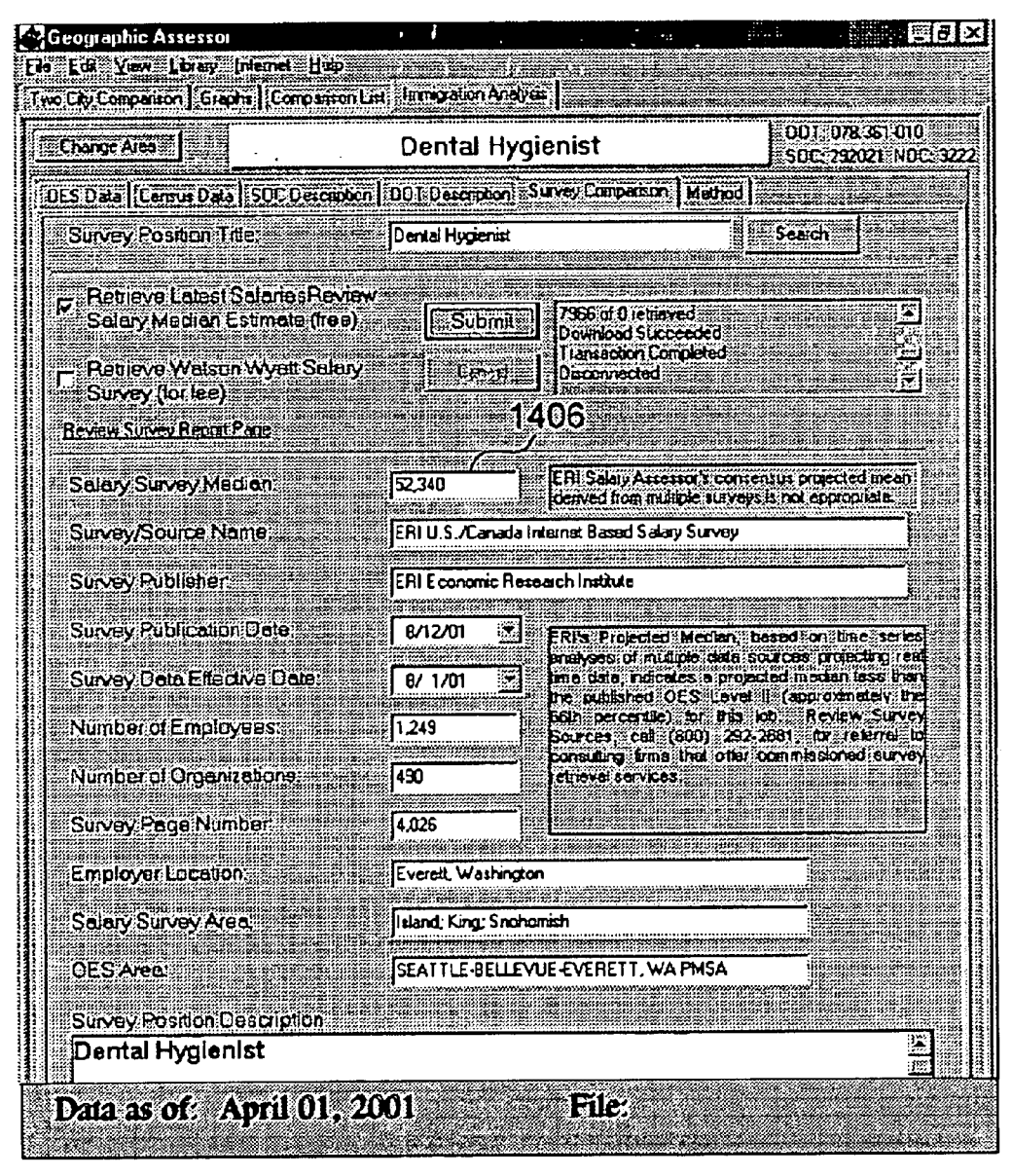

As indicated by the tabs 1402a–c along the top of the output data field 1400, the user can select to have the output data based on OES data or sources other than OES data. The user can also click on description tabs 1403a and 1403b to obtain an OES description for a job (the SOC description tab 1403a) or a Dictionary of Occupational Titles description (the DOT description tab 1403b). Each source may have different data obtained from different populations. The surveys can include the OES data described above, census data, data obtained from users over the Internet (indicated by tab 1402c, labeled survey comparison) and/or other sources, such as data available from Watson Wyatt of Washington D.C. or other service providers. If the user selects the survey comparison tab 1402c, the Geographic Assessor 148c displays an input field 1404, shown in FIG. 14B. FIG. 14C illustrates an output data field 1406 based on the survey comparison.

An advantage of the features described above with reference to FIGS. 14A–C is that the user can access multiple databases to obtain a broad data sampling (when appropriate), or can elect to access a single database (when appropriate). The user can also select which database is accessed. One particular advantage of the foregoing features is that employers can readily access data other than OES data. For example, employers may be required by government regulations to pay at levels corresponding to Level I or Level II (depending on the employee's skill level) as shown in FIG. 14A, unless the employer can provide survey results indicating a mean compensation level less than Level I and Level II. The results shown in FIG. 14C indicate that the employer can easily access such data. For example, the value indicated in a salary survey median field 1406 of FIG. 14C is less than both the Level I and Level II values shown in FIG. 14A, for the selected geographic area. Accordingly, the employer may be able to reduce labor costs by having ready access to data such as are shown in FIG. 14C. The employer can obtain further information about the survey by clicking on a "Review Summary Report Page" icon, which links the employer to a survey report page 1408 (FIG. 14D), generally similar to the display page 812 described above with reference to FIG. 8B.

In other embodiments, any of the Assessors 148 described above can have access to a number of surveys and/or populations, which can be selected by the user in a manner generally similar to that described above. In any of these embodiments, the Assessors 148 can access selected databases over the Web 106 or other networks.

From the foregoing, it will be appreciated that although specific embodiments of the invention have been disclosed herein for purposes of illustration, various modifications may be made without deviating from the spirit and scope of the invention. For example, many of the features described above can be incorporated into an educational platform for training compensation and benefits personnel, such as is disclosed in co-pending U.S. application Ser. No. 09/849, 454, titled System and Method for Remote Learning, Such as for Costs and Benefits Personnel and Professionals filed concurrently herewith, assigned to the assignee of the present application, and incorporated herein by reference. Accordingly, the invention is not limited except as by the appended claims.

What is claimed is:

1. A method in a computer system for exchanging economic data with a user, comprising:

receiving a request from a user for a first item of economic data, the first item including at least one of wage data, cost of living data, cost of labor data, and employee benefit data based on a first sample size;

retrieving the first item of economic data from a database;

providing over the Internet a web page for view by the user, the web page displaying the first item of economic data and an indication of the first sample size;

receiving a second item of economic data from the user over the Internet in exchange for the first item of economic data, the second item of economic data including at least one of wage data, cost of living data, cost of labor data and employee benefit data;

checking the second item of economic data for validity or acceptability by determining whether the second item of economic data is consistent with economic data in the database of the same type as the second item of data; and updating the database to include the second item of data if the second item of data is determined to be valid or acceptable; and updating the first sample size to be a second sample size greater than the first sample size.

2. The method of claim 1 wherein determining whether the second item of economic data is consistent with the economic data in the database includes determining whether the second item falls within two standard deviations of a mean for data in the database averagable with the second item of data.

3. The method of claim 1 wherein receiving the second item of economic data includes receiving at least one of the user's geographic location, position, year of experience in the position, annual salary and annual bonus or incentive payment.

4. A computer-readable medium storing or transmitting instructions which, when implemented by a computer perform a method for exchanging economic data with a user, comprising:

receiving over a computer network a user request for a first item of economic data, the first item including at least one of wage data, cost of living data, cost of labor data, and employee benefit data based on a first sample size;

retrieving the first item of economic data from a database;

providing a display description for view by the user over the computer network, the display description including the first item of economic data and an indication of the first sample size;

receiving a second item of economic data from the user over the computer network, the second item of economic data including at least one of wage data, cost of living data, cost of labor data, and employee benefit data;

checking the second item of economic data for validity or acceptability by determining whether the second item of economic data is consistent with economic data in th database of the same type as the second item of data; and updating the database to include the second item of data if the second item of data is determined to be valid and updating the first sample size to be a second sample size greater than the first sample size.

5. The computer-readable medium of claim 4, further comprising reducing a fee from the user for receiving the first item of economic data, wherein at least reducing a fee due from the user includes eliminating any fee due from the user for the first item of economic data.

6. The computer-readable medium of claim 4 wherein providing the first item of economic date includes providing domestic and/or international wage data, cost of living data, coat of labor data and/or employee benefit data.

7. The computer-readable medium of claim 4 wherein receiving the second item of economic data from the user includes receiving economic data specific to the user.

8. The computer-readable medium of claim 4, further comprising providing the first item of economic data to the user free of charge.

9. The computer-readable medium of claim 4, further comprising checking the second item of economic data for validity by determining whether a numerical value of the second item is within two standard deviations of a mean for data in the database of the same type as the second item of economic data and averagable with the second item of economic data.

10. The computer-readable medium of claim 4 wherein the request is a first request and wherein the method further comprises:

receiving over the computer network a second user request for economic data;

retrieving the economic data from the database in response to a second request from the user after the database has been updated to include the second item of economic data; and displaying the economic data to the user over the computer network, the economic date being based at least in part on the second item of economic data in the database.

11. The computer-readable medium of claim 4 wherein the first item of economic data can be averaged from a plurality of data sources, and wherein the method further includes receiving, a request that the data be based on a selected subset of the plurality of data sources.

12. A method in a computer system for updating a database with economic data provided by a user over the Internet, the method comprising:

providing a database accessible to users over the Internet, the database having economic data including wage data, cost of living data, end/or employee benefit data based on a first sample size;

responding to a first request for economic data by retrieving first output data from the database, providing the first output data over, the Internet and indicating over the Internet the first sample size;

receiving input data over the internet, the input data including wage data, coat of living data, end/or employee benefit data;

updating the database to include the input data received over the Internet and updating the first sample size to be a second sample size greater than the first sample size;

receiving a second request for economic data over the Internet;

retrieving second output data from the database and providing the second output data over the Internet in response to the second request, the second output data being based at least in part on the input data received over the internet; and indicating over the Internet that the sample size on which the second output data is based is the second sample size.

13. The method of claim 12 further comprising at least reducing a fee for the first output data in response to receiving input data.

14. The method of claim 12, further comprising determining whether the input data are consistent with data in the database by determining whether the input data are within two standard deviations of a mean for data in the database averagable with the input data.

15. The method of claim 12 wherein the database includes data gathered by a governmental entity.

16. The method of claim 12 wherein the first and second requests are received from a single user.

17. The method of claim 12 wherein the first request is received from a first user end the second request is received from a second user.

18. The method of claim 12, further comprising checking the input data for validity by determining whether the input data are consistent with economic data in the database of the same type as the input data.

19. The method of claim 12, wherein a single user receives the first output data and provides the input data over the Internet, and wherein the method further comprises:

assigning a first value to the economic data provided in response to the first request;

assigning a second value to the input data received over the Internet; and calculating a fee due for the first output data by subtracting the second value from the first value.

20. The method of claim 12 wherein a single user receives the first output data and provides the input data over the Internet, and wherein the method further comprises at least reducing a fee due from the single user for receiving the first output data.

21. A computer system for exchanging economic data with a user, comprising means for receiving over a computer network a user request for a first item of economic data, the first item including at least one of wage data, cost of living data, cost of labor data, and employee benefit data, based on a first sample size;

means for retrieving the first item of economic data from a database;

means for providing a display description for view by the user over the computer network, the display description including the first item of economic data and an indication of the first sample size;

means for receiving a second item of economic data over the computer network, the second item of economic data including at least one of wage data; cost of living data, cost of labor data, and employee benefit data;

means for checking the second item of economic data for validity or acceptability by determining whether the second item of economic data is consistent with economic data in the database of the same type as the second item of data;

means for updating the database to include the second item of data if the second item of data is determined to be valid; and means for updating the first sample size to be a second sample size greater than the first sample size.

22. A computer system for updating a database with economic data provided by a user over a computer network, the method comprising;

means for providing a database accessible to users over the computer network, the database having economic data including wage data, cost of living data, and/or employee benefit data based on a first sample size;

means for responding to a first request for economic data by retrieving first output data from the database, providing the first output data over the Internet and indicating over the Internet the first sample size;

means for receiving input data over the Internet, the input data including wage data, cost of living data, and/or employee benefit data;

means for updating the database to include the input data received over the Internet and updating the first sample size to be a second sample size greater than the first sample size;

means for receiving a second request for economic data over the internet;

means for retrieving second output data from the database and providing the second output data over the Internet in response to the second request, the second output data being based at least in part on the input data received over the Internet; and means for indicating over the Internet that the sample size, on which the second output data is based, is the second sample size.

* * * * *

UNITED STATES PATENT AND TRADEMARK OFFICE
CERTIFICATE OF CORRECTION

PATENT NO. : 6,862,596 B2
DATED : March 1, 2005
INVENTOR(S) : David J. Thomsen

It is certified that error appears in the above-identified patent and that said Letters Patent is hereby corrected as shown below:

Column 13,
Line 33, "year" should be -- years --;
Line 58, "th" should be -- the --;

Column 14,
Line 4, "date" should be -- data --;
Line 6, "coat" should be -- cost --;
Line 29, "date" should be -- data --;
Line 43, "end/or" should be -- and /or --;

Column 15,
Line 11, "end" should be -- and --;

Column 16,
Line 17, "comprising;" should be -- comprising: --;

Signed and Sealed this

Nineteenth Day of July, 2005

JON W. DUDAS
*Director of the United States Patent and Trademark Office*